United States Patent
Katayama et al.

(10) Patent No.: US 9,222,710 B2
(45) Date of Patent: Dec. 29, 2015

(54) HEAT-PUMP AUTOMOTIVE AIR CONDITIONER AND DEFROSTING METHOD OF THE HEAT-PUMP AUTOMOTIVE AIR CONDITIONER

(75) Inventors: Akira Katayama, Tokyo (JP); Nobuya Nakagawa, Tokyo (JP); Toshihisa Kondou, Tokyo (JP); Masatoshi Morishita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 235 days.

(21) Appl. No.: 13/814,656

(22) PCT Filed: Jun. 27, 2011

(86) PCT No.: PCT/JP2011/064705
§ 371 (c)(1),
(2), (4) Date: Feb. 6, 2013

(87) PCT Pub. No.: WO2012/060132
PCT Pub. Date: May 10, 2012

(65) Prior Publication Data
US 2013/0139528 A1    Jun. 6, 2013

(30) Foreign Application Priority Data

Nov. 1, 2010    (JP) .................................. 2010-245220
Jan. 28, 2011    (JP) .................................. 2011-017089

(51) Int. Cl.
*B60H 1/32*    (2006.01)
*F25B 30/02*    (2006.01)
*B60H 1/00*    (2006.01)

(52) U.S. Cl.
CPC ............ *F25B 30/02* (2013.01); *B60H 1/00921* (2013.01); *F25B 2400/16* (2013.01)

(58) Field of Classification Search
CPC ..................... F25B 2400/04; F25B 2400/0409; F25B 2600/2501; F25B 2600/2523; F25B 2313/02322; F25B 2313/02332; F25B 47/02; F25D 21/06; F25D 21/02
USPC .......................................... 62/244, 81, 324.5
See application file for complete search history.

(56) References Cited

U.S. PATENT DOCUMENTS 3,670,808 A * 6/1972 Wait, Jr. ........................... 165/42
4,962,648 A * 10/1990 Takizawa et al. ............... 62/199

(Continued)

FOREIGN PATENT DOCUMENTS

CN    1491821 A    4/2004
JP    2000-52757 A    2/2000

(Continued)

OTHER PUBLICATIONS

International Search Report of PCT/JP2011/064705, date of mailing date Sep. 20, 2011.

(Continued)

*Primary Examiner* — Cheryl J Tyler
*Assistant Examiner* — David Teitelbaum
(74) *Attorney, Agent, or Firm* — Westerman, Hattori, Daniels & Adrian, LLP

(57) ABSTRACT

A refrigerant cycle (16) for cooling as a prototype is provided with: an internal condenser (8) connected to a discharge circuit of an electric compressor (9) and disposed on a downstream of an internal evaporator (7) of an HVAC unit (2); a first heating circuit (18) connected to a receiver (11) through a switching unit (17) arranged on an inlet side of the external condenser (8); and a second heating circuit (23) connected between an outlet side of the receiver (11) and a suction side of the electric compressor (9) and provided with a second expansion valve (20) and an external evaporator (21). A heat pump cycle (24) for heating is formed by a second heating circuit (23) including the electric compressor (9), the internal condenser (8), the switching unit (17), the first heating circuit (18), the receiver (11), the second expansion valve (20), and the external evaporator (21).

10 Claims, 15 Drawing Sheets

(56) References Cited

U.S. PATENT DOCUMENTS

| | | | |
|---|---|---|---|
| 5,275,008 A * | 1/1994 | Song et al. | 62/81 |
| 5,515,689 A * | 5/1996 | Atterbury | 62/80 |
| 5,544,493 A * | 8/1996 | Suzuki et al. | 62/133 |
| 5,634,348 A * | 6/1997 | Ikeda et al. | 62/160 |
| 6,347,528 B1 * | 2/2002 | Iritani et al. | 62/324.6 |
| 6,370,903 B1 * | 4/2002 | Wlech | 62/324.6 |
| 6,430,951 B1 * | 8/2002 | Iritani et al. | 62/229 |
| 2001/0018831 A1 | 9/2001 | Honda | |
| 2003/0037562 A1 * | 2/2003 | Honda et al. | 62/324.1 |
| 2003/0182961 A1 * | 10/2003 | Nishida et al. | 62/324.1 |
| 2003/0200764 A1 * | 10/2003 | Takeuchi et al. | 62/500 |
| 2005/0257545 A1 * | 11/2005 | Ziehr et al. | 62/236 |
| 2006/0042285 A1 | 3/2006 | Heberle et al. | |
| 2006/0191280 A1 * | 8/2006 | Kurosawa | 62/324.1 |
| 2006/0254308 A1 * | 11/2006 | Yokoyama et al. | 62/500 |

FOREIGN PATENT DOCUMENTS

| | | |
|---|---|---|
| JP | 2002-46448 A | 2/2002 |
| JP | 2004-182168 A | 7/2004 |
| JP | 2004-182201 A | 7/2004 |
| JP | 2006-341784 A | 12/2006 |
| JP | 2009-23564 A | 2/2009 |
| JP | 2009-184728 A | 8/2009 |
| JP | 2010-111222 A | 5/2010 |
| JP | 2011-40187 A | 2/2011 |

OTHER PUBLICATIONS

Japanese Decision to Grant a Patent dated Aug. 5, 2014, issued in corresponding Japanese Patent Application No. 2011-017089 (3 pages).

Japanese Decision to Grant a Patent dated Aug. 5, 2014, issued in corresponding Japanese Patent Application No. 2011-245220 (3 pages).

Chinese Office Action dated Sep. 3, 2014, issued in corresponding CN application No. 201180031903.0 with English translation.

Decision to Grant a Patent dated Mar. 25, 2015, issued in corresponding Chinese Patent Application No. 201180031903.0 with English translation (4 pages) Explanation of relevance—"The Decision to Grant a Patent has been received."

* cited by examiner

HEAT-PUMP AUTOMOTIVE AIR CONDITIONER AND DEFROSTING METHOD OF THE HEAT-PUMP AUTOMOTIVE AIR CONDITIONER

TECHNICAL FIELD

The present invention relates to a heat-pump automotive air conditioner and a defrosting method of the heat-pump automotive air conditioner applied to an air conditioner of an electric vehicle, a hybrid vehicle, and the like.

BACKGROUND ART

Heating mode using combustion exhaust heat of engine cooling water or the like cannot be performed in a automotive air conditioner applied to an electric vehicle (EV), a hybrid vehicle (such as HEV and PHEV) and the like. Exhaust heat from a drive motor, a battery, or the like as an alternative to the engine can be used. However, the amount of exhaust heat is small, and a heating system with only the exhaust heat as a heat source cannot be realized.

Particularly, the engine is terminated as much as possible in hybrid vehicles to save fuel. Moreover, the amount of exhaust heat is small even when exhaust heat from a drive motor, an inverter, a battery, or the like as an alternative to the engine is used. Therefore, the heating system using only the exhaust heat as the heat source cannot be realized. Meanwhile, although a heating system using an electric heater can be considered, the heating power consumption is large relative to the battery capacity. Therefore, there is a problem that the drive distance of the vehicle is significantly reduced.

An automotive air conditioner of a heat pump system including an electric compressor can be considered as an automotive air conditioner applied to an electric vehicle and the like. However, in a heat pump of a reverse system for switching a refrigerant circuit to operate a condenser as an evaporator and operate an evaporator as a condenser during heating, a heat exchanger and the like, such as piping, an evaporator, and a condenser, included in the refrigerant circuit need to be able to be shared under different pressure conditions of cooling mode and heating mode. The automotive air conditioner applied to a vehicle of an existing engine drive system needs to be significantly changed. Defrosting of frost formed on an external evaporator when the ambient temperature is low is a major problem.

Meanwhile, an automotive air conditioner illustrated in PTL 1 is known as an example of an automotive air conditioner that allows heat pump heating using an evaporator of an existing system as an internal evaporator arranged in an HVAC unit (Heating Ventilation and Air Conditioning Unit). A heating circuit is additionally installed, wherein an internal condenser is arranged on a downstream of an internal evaporator in an HVAC unit of an automotive air conditioner including an existing refrigerant cycle for cooling, the internal condenser is connected to a discharge circuit of a compressor, a three-way valve is arranged on an outlet side to connect a receiver, a refrigerant from the receiver through a subcooler and an expansion valve arranged on an upstream of the internal evaporator in the HVAC unit is guided to an external condenser that functions as an evaporator during heating, and the refrigerant is circulated to a suction side of the compressor from the outlet side.

An automotive air conditioner illustrated in PTL 2 is proposed as another example of the automotive air conditioner that enables the heat pump heating using the evaporator of the existing system as the internal evaporator arranged in the HVAC unit. An internal condenser is arranged on a downstream of an internal evaporator in an HVAC unit of an automotive air conditioner including an existing refrigerant cycle for cooling. The internal condenser is connected to a discharge circuit of a compressor, and a parallel circuit of a bypass circuit including a first electronic expansion valve and a first solenoid valve is connected to an outlet side. The bypass circuit including a second solenoid valve is connected to a second electronic expansion valve and the internal evaporator.

CITATION LIST

Patent Literature

{PTL 1}
Japanese Unexamined Patent Application, Publication No. 2009-23564
{PTL 2}
Japanese Unexamined Patent Application, Publication No. 2010-111222

SUMMARY OF INVENTION

Technical Problem

However, in PTL 1, the external condenser and the refrigerant piping connected to the external condenser need to be a heat exchanger with a condensing function and an evaporation function and piping for low and high pressures. Therefore, an amount of change from the existing system must be large. The receiver and the subcooler in addition to the internal condenser need to be arranged on the HVAC unit installed in the vehicle interior. Therefore, increase in the size of the HVAC unit cannot be avoided. As a result, it is difficult to secure the installation space, and there are problems, such as deterioration of ease of mounting on the vehicle.

In PTL 2, the air conditioner is operated while the external evaporator is terminated, even if frost is formed on the external evaporator during heating. Heat according to the workload of the compressor is released by the internal condenser and the external evaporator, and the external evaporator can be defrosted while attaining the feeling of heating. However, the external condenser and the refrigerant piping connected to the external condenser need to be a heat exchanger with a condensing function and an evaporation function and piping for low and high pressures in the configuration shown in PTL 2. The existing system needs to be significantly changed. A low-cost heat-pump automotive air conditioner with a simple configuration that shares the external condenser, the refrigerant piping, and the like of the existing system cannot be manufactured.

The external evaporator can be defrosted while attaining the feeling of heating. However, the heat according to the workload of the compressor is divided for the internal condenser and the external evaporator to release the heat to perform the heating and defrosting. A lack of heat is undeniable, and it may be difficult to attain sufficient feeling of heating and to remove the frost in a short time. Although it is desirable to set an inside air circulation mode to improve the heating efficiency in the defrosting mode, window fogging may occur. Therefore, the drive needs to be based on an outside air intake mode, and it may be difficult to reduce the heating load.

The present invention has been made in view of the foregoing circumstances, and an object of the present invention is to provide a low-cost highly reliable heat-pump automotive air conditioner with excellent ease of mounting and a defrosting method of the heat-pump automotive air conditioner that can eliminate the problems during frost formation on the external evaporator and that can be suitably applied to an electric vehicle, a hybrid vehicle, and the like, just by sharing circuit sections and devices with substantially the same pressure conditions as those of a cooling cycle of an existing automotive air conditioner and by adding minimal heating circuits and devices with different pressure conditions.

Solution to Problem

To solve the problems, a heat-pump automotive air conditioner of the present invention employs the following means.

A first aspect of the present invention provides a heat-pump automotive air conditioner including: a refrigerant cycle for cooling, to which an electric compressor, an external condenser, a receiver, a first expansion valve, and an internal evaporator arranged in an HVAC unit are connected in this order; an internal condenser connected to a discharge circuit of the electric compressor and disposed on a downstream of the internal evaporator in the HVAC unit; a first heating circuit connected to the receiver through a switching unit arranged on an inlet side of the external condenser; and a second heating circuit connected between an outlet side of the receiver and a suction side of the electric compressor and provided with a second expansion valve and an external evaporator, wherein the second heating circuit that includes the electric compressor, the internal condenser, the switching unit, the first heating circuit, the receiver, the second expansion valve, and the external evaporator is capable of forming a heat pump cycle for heating.

According to the first aspect of the present invention, a refrigerant cycle for cooling including an electric compressor, an external condenser, a receiver, a first expansion valve, an internal evaporator arranged in an HVAC unit, and the like is provided with: an internal condenser connected to a discharge circuit of the electric compressor and disposed on a downstream of the internal evaporator in the HVAC unit; a first heating circuit connected to the receiver through a switching unit arranged on an inlet side of the external condenser; and a second heating circuit connected between an outlet side of the receiver and a suction side of the electric compressor and provided with a second expansion valve and an external evaporator, wherein the second heating circuit that includes the electric compressor, the internal condenser, the switching unit, the first heating circuit, the receiver, the second expansion valve, and the external evaporator can form a heat pump cycle for heating. Therefore, minimal heating circuits and devices, such as the internal condenser, the first heating circuit between the inlet side of the external condenser and the receiver, and the second heating circuit including the second expansion valve and the external evaporator between the outlet side of the receiver and the suction side of the electric compressor, are connected to the discharge circuit of the refrigerant cycle for cooling as a prototype. In this way, the circuit sections and the devices with the same pressure conditions can be shared to form the heat pump cycle for heating. Therefore, a low-cost, highly reliable heat-pump automotive air conditioner with excellent ease of mounting that can be suitably applied to an electric vehicle, a hybrid vehicle, and the like can be provided just by sharing the circuit sections and devices with the same pressure conditions as those of the cooling cycle of an existing automotive air conditioner used in an ICEV system and by adding minimal heating circuits and devices with different pressure conditions, without newly developing circuits with specifications that can endure both the cooling and heating modes.

In the heat-pump automotive air conditioner described above according to the first aspect of the present invention, the external evaporator is installed in an air duct of an external fan for the external condenser, in parallel with the external condenser.

According to the first aspect of the present invention, the external evaporator is installed in an air duct of an external fan for the external condenser, in parallel with the external condenser. Therefore, the external fan that ventilates the outside air to the external condenser for cooling can ventilate the outside air to the external evaporator arranged for the heating cycle, and the heat can be absorbed from the outside air to perform the heat pump heating. As a result, the external fan can be shared to reduce the number of components. The configuration of the heat-pump automotive air conditioner can be simplified and downsized, and the cost can be reduced.

In one of the heat-pump automotive air conditioners described above according to the first aspect of the present invention, the receiver is a receiver with check valves, the check valves incorporated into refrigerant inlets of a refrigerant circuit from the external condenser connected to the receiver and of the first heating circuit.

According to the first aspect of the present invention, the receiver is a receiver with check valves, the check valves incorporated into refrigerant inlets of a refrigerant circuit from the external condenser connected to the receiver and of the first heating circuit. Therefore, the refrigerant circuit for cooling or heating not used depending on the drive mode can be cut off through the check valves incorporated into the refrigerant inlets of the receiver. As a result, connection components, such as a flange, are not necessary as compared to a configuration that includes the receiver and the check valves individually arranged in the refrigerant circuit. The refrigerant circuit can be simplified, and the cost can be reduced.

In one of the heat-pump automotive air conditioners described above according to the first aspect of the present invention, the first expansion valve and the second expansion valve are automatic thermal expansion valves, and a first solenoid valve and a second solenoid valve are arranged on inlet sides of the first expansion valve and the second expansion valve, respectively.

According to the first aspect of the present invention, the first expansion valve and the second expansion valve are automatic thermal expansion valves, and a first solenoid valve and a second solenoid valve are arranged on inlet sides of the first expansion valve and the second expansion valve, respectively. Therefore, the expansion valves can be conventionally used automatic thermal expansion valves, and a control system that controls the degree of opening of the expansion valves is not necessary. The refrigerant circuit not used depending on the operating mode can be fully closed by the first solenoid valve and the second solenoid valve, and staying of the refrigerant in the circuit and the like can be prevented. Therefore, inexpensive, highly reliable automatic thermal expansion valves can be used as the expansion valves. The paused circuit can be surely and fully closed by the solenoid valves, and staying of the refrigerant and the like can be prevented.

In one of the heat-pump automotive air conditioners described above according to the first aspect of the present invention, the first expansion valve and the second expansion valve are electronic expansion valves.

According to the first aspect of the present invention, the first expansion valve and the second expansion valve are electronic expansion valves. Therefore, in the refrigerant circuit for cooling or heating not used depending on the operating mode, the electronic expansion valves arranged in the circuit can be fully closed to prevent staying of the refrigerant in the external evaporator paused during cooling and in the internal evaporator paused during heating. As a result, the solenoid valves and the like for fully closing the paused circuit are not necessary. The refrigerant circuit can be simplified, and the cost can be reduced.

In one of the heat-pump automotive air conditioners described above according to the first aspect of the present invention, check valves are arranged on the second heating circuit and the refrigerant circuit for connecting the external evaporator as well as the internal evaporator with the suction side of the electric compressor.

According to the first aspect of the present invention, check valves are arranged on the second heating circuit and the refrigerant circuit for connecting the external evaporator as well as the internal evaporator with the suction side of the electric compressor. Therefore, the check valves can cut off between the external evaporator or the internal evaporator paused depending on the operating mode and the suction side of the electric compressor. As a result, the function of the pausing external evaporator or the internal evaporator can be surely terminated.

In one of the heat-pump automotive air conditioners described above according to the first aspect of the present invention, an auxiliary electric heater for heating is arranged in the HVAC unit.

According to the first aspect of the present invention, an auxiliary electric heater for heating is arranged in the HVAC unit. Therefore, in a situation that the heating performance is insufficient, such as when the ambient temperature is low, when heating is started, and when the window is frosted, the auxiliary electric heater can be temporarily operated at the same time as the heat-pump heating mode to increase the blowoff air temperature to supplement the insufficiency in the heating performance. Therefore, the maximum required heating performance can be sufficiently secured. The utilization rate of the auxiliary electric heater can be reduced compared to the heating mode using the electric heater as a main heat source, and the system can be operated efficiently. A reduction in the vehicle drive distance due to an increase in the heating power consumption can be suppressed.

A second aspect of the present invention provides a heat-pump automotive air conditioner including: a refrigerant cycle for cooling, to which an electric compressor, an external condenser, a receiver, a first expansion valve, and an internal evaporator arranged in an HVAC unit are connected in this order; an internal condenser connected to a discharge circuit of the electric compressor and disposed on a downstream of the internal evaporator in the HVAC unit; a first heating circuit connected to the receiver through a switching unit arranged on an inlet side of the external condenser; and a second heating circuit connected between an outlet side of the receiver and a suction side of the electric compressor and provided with a second expansion valve and an external evaporator. In the second aspect of the present invention, the second heating circuit includes the electric compressor, the internal condenser, the switching unit, the first heating circuit, the receiver, the second expansion valve, and the external evaporator. In the second aspect of the present invention, the second heating circuit forms a heat pump cycle for heating. In the second aspect of the present invention, when frost formation is detected for the external evaporator during heating by the heat pump cycle for heating, a flow of a refrigerant to the second heating circuit can be cut off to distribute the refrigerant toward the internal evaporator, and switch to dehumidification heating using the internal evaporator is possible.

According to the second aspect of the present invention, a second heating circuit including an internal condenser, a first heating circuit, a second expansion valve, and an external evaporator are additionally arranged on a refrigerant cycle for cooling including an electric compressor, an external condenser, a receiver, a first expansion valve, and an internal evaporator arranged in an HVAC unit. The second heating circuit including the electric compressor, the internal condenser, the switching unit, the first heating circuit, the receiver, the second expansion valve, and the external evaporator form a heat pump cycle for heating. Therefore, minimal heating circuits and devices, such as the internal condenser, the first heating circuit, and the second heating circuit including the second expansion valve and the external evaporator, can be connected to the refrigerant cycle for cooling as a prototype. As a result, the refrigerant circuit and the devices with the same pressure conditions can be shared to form the heat pump cycle for heating. Therefore, a low-cost, highly reliable, highly efficient heat-pump automotive air conditioner with a relatively simple configuration and with excellent ease of mounting that can be suitably applied to electric vehicles and hybrid vehicles can be provided just by sharing the refrigerant circuit and devices with the same pressure conditions as those of the cooling cycle of an existing automotive air conditioner applied to an internal combustion engine vehicle (ICEV) system and by adding minimal heating circuits and devices with different pressure conditions, without newly developing refrigerant circuits with specifications that can endure both the cooling and heating modes. Even if frost is formed on the external evaporator when the ambient temperature is low, the flow of the refrigerant to the second heating circuit can be cut off to distribute the refrigerant toward the internal evaporator, and the switch to the dehumidification heating using the internal evaporator is possible. Therefore, when the frost is formed on the external evaporator, the evaporator can be switched to the internal evaporator, and efficient heat-pump heating mode can be continued. Therefore, interruption of the heating mode or loss of power consumption by switching to the defrosting mode in the heating mode when the vehicle is running can be eliminated. If the frost formed on the external evaporator when the vehicle is running is naturally defrosted, the heat-pump heating mode using the external evaporator may be restored.

In the heat-pump automotive air conditioner described above according to the second aspect of the present invention, when the switch is made to the dehumidification heating using the internal evaporator, the heat-pump automotive air conditioner is operated in an inside air circulation mode or an inside air/outside air mixed mode.

According to the second aspect of the present invention, when the switch is made to the dehumidification heating using the internal evaporator, the heat-pump automotive air conditioner is operated in an inside air circulation mode or an inside air/outside air mixed mode. Therefore, when the switch is made to the dehumidification heating using the internal evaporator due to the frost formation on the external evaporator, the inside air circulation mode or the inside air/outside air mixed mode can be set to use internal air at a high temperature as a heat source to perform the heat-pump heating mode. As a result, the heating performance can be sufficiently secured. When the ambient temperature is low, the heating is usually performed in the outside air intake mode to prevent window fogging. However, the dehumidification heating using the internal evaporator can prevent the window fogging even based on the inside air circulation mode or the inside air/outside air mixed mode.

In one of the heat-pump automotive air conditioners described above according to the second aspect of the present invention, the external evaporator is located in an air duct of an external fan for the external condenser, on a downstream of the external condenser and/or a vehicle radiator.

According to the second aspect of the present invention, the external evaporator is disposed in an air duct of an external fan for the external condenser, on a downstream of the external condenser and/or a vehicle radiator. Therefore, the external condenser and/or the vehicle radiator can block snow during snowfall or can block deposited snow, and the attachment of the snow to the external evaporator can be reduced. Therefore, the heat exchange performance in the external evaporator can be secured to improve the heating performance, and freezing by the attachment of snow to the external evaporator can be prevented. If there is heat released from the radiator for vehicle, the heat can be absorbed to improve the heating performance.

In one of the heat-pump automotive air conditioners described above according to the second aspect of the present invention, an auxiliary electric heater for heating is installed on an upstream of the internal evaporator in the HVAC unit, and when an amount of absorbed heat is insufficient during heating, the auxiliary electric heater can be activated to absorb the heat, and heat-pump heating mode is possible.

According to the second aspect of the present invention, the auxiliary electric heater for heating is installed on the upstream of the internal evaporator in the HVAC unit, and if the amount of absorbed heat is insufficient during heating, the auxiliary electric heater can be activated to absorb the heat to perform the heat-pump heating mode. Therefore, if the amount of absorbed heat in the internal evaporator is insufficient, and the internal temperature does not rise sufficiently, the auxiliary electric heater can be energized to absorb the heat to perform the heat-pump heating mode. As a result, even if the heating performance is insufficient when the ambient temperature is low, the heating performance can be easily supplemented. The auxiliary electric heater can be similarly used as an auxiliary heat source during the heating mode using the external evaporator.

In one of the heat-pump automotive air conditioners described above according to the second aspect of the present invention, an internal heat exchanger that exchanges heat of a low-pressure gas refrigerant introduced to the electric compressor and a high-pressure liquid refrigerant from the receiver is arranged between intake piping of the electric compressor and outlet refrigerant piping of the receiver.

According to the second aspect of the present invention, an internal heat exchanger that exchanges heat of a low-pressure gas refrigerant introduced to the electric compressor and a high-pressure liquid refrigerant from the receiver is arranged between intake piping of the electric compressor and outlet refrigerant piping of the receiver. Therefore, the internal heat exchanger can exchange the heat between the low-pressure gas refrigerant and the high-pressure liquid refrigerant both during cooling and during heating to thereby supercool the high-pressure liquid refrigerant to increase the amount of absorbed heat by the evaporator. In this way, the cooling efficiency and the heating efficiency can be improved, and the cooling and heating performance of the heat-pump automotive air conditioner can be improved.

A third aspect of the present invention provides a defrosting method of the external evaporator in one of the heat-pump automotive air conditioners described above, wherein the automotive air conditioner is operated in the cooling cycle by setting a temperature regulation door of the HVAC unit to a maximum cooling position and setting an inside/outside air switch door to an inside air circulation mode when there is no passenger after termination of the vehicle, and the external evaporator is defrosted by warm air heated by hot gas distributed to the external condenser.

According to the third aspect of the present invention, in the defrosting method of the external evaporator of one of the heat-pump automotive air conditioners described above, the automotive air conditioner is operated in the cooling cycle by setting a temperature regulation door of the HVAC unit to a maximum cooling position and setting an inside/outside air switch door to an inside air circulation mode when there is no passenger after termination of the vehicle, and the external evaporator is defrosted by warm air heated by hot gas distributed to the external condenser. Even if frost is formed on the external evaporator during the heating mode, the defrosting mode is not performed when the vehicle is running, and the heating mode is continued by switching to the dehumidification heating using the internal evaporator. When there is no passenger after the termination of the vehicle, the automotive air conditioner is operated in the cooling cycle by setting the temperature regulation door of the HVAC unit to the maximum cooling position and setting the inside/outside air switch door to the inside air circulation mode. In this way, warm air heated by hot gas distributed to the external condenser can be used to melt the frost and defrost the external evaporator. Therefore, defrosting is possible without supplying the high-pressure hot gas to the external evaporator on which the frost is formed. New development of the refrigerant circuits and devices with specifications that can endure the circulation of refrigerants at high and low pressures is not necessary. In the defrosting, the temperature regulation door of the HVAC unit is set to the maximum cooling position, and the inside/outside air switch door is set to the inside air circulation mode. The internal air is used as the heat source, and the heat of the hot gas can be effectively used for the defrosting while eliminating the heat release loss in the internal condenser. Therefore, defrosting is possible in a relatively short time.

In the defrosting method of the external evaporator of the heat-pump automotive air conditioner described above according to the third aspect of the present invention, the defrosting mode of the external evaporator is performed during or after charge of a vehicle battery when there is no passenger after the termination of the vehicle.

According to the third aspect of the present invention, the defrosting mode of the external evaporator is performed during or after charge of a vehicle battery when there is no passenger after the termination of the vehicle. As a result, the influence of the defrosting mode on the drive distance of the vehicle can be avoided, and the defrosting mode can be performed when there is enough battery capacity during or after the charge of the vehicle battery. Therefore, the external evaporator can be efficiently and surely defrosted without affecting the passenger in any way.

In one of the defrosting methods of the external evaporator of the heat-pump automotive air conditioner described above according to the third aspect of the present invention, a blowoff mode of the HVAC unit is one of a def mode, a face mode, and a bilevel mode in the defrosting mode.

According to the third aspect of the present invention, in the defrosting mode of the external evaporator, the blowoff mode of the HVAC unit is set to one of the def mode, the face mode, and the bilevel mode. Therefore, in the defrosting mode of the external evaporator performed in the inside air circulation mode, the reduction in the temperature by the heat absorption by the internal evaporator and short circuiting of the air, which is blown off from the foot blowoff port to the vehicle interior, from the suction port for the inside air circulation near the foot blowoff port can be prevented. As a result, the temperature of the air sucked from the vehicle interior by the inside air circulation can be increased as much as possible, and the external evaporator can be effectively defrosted in a short time.

In one of the defrosting methods of the external evaporator of the heat-pump automotive air conditioner described above according to the third embodiment of the present invention, when internal temperature is low in the defrosting mode, the auxiliary electric heater is activated, and the internal evaporator absorbs the heat to improve defrosting performance.

According to the third aspect of the present invention, if the internal temperature is low in the defrosting mode of the external evaporator, the auxiliary electric heater is activated, and the internal evaporator absorbs the heat to improve the defrosting performance. Therefore, if the internal temperature is low in the defrosting mode of the external evaporator performed in the inside air circulation mode, the inside air circulated by the auxiliary electric heater can be heated to allow the internal evaporator to sufficiently absorb the heat. Therefore, efficient defrosting is possible in a short time even if the internal temperature is low. In the defrosting, the number of rotations of the electric compressor can be increased to supply hot gas at a higher temperature to the external condenser to thereby further reduce the defrosting time of the external evaporator.

In one of the defrosting methods of the external evaporator of the heat-pump automotive air conditioner described above according to the third aspect of the present invention, to finish the defrosting mode, the heat-pump heating mode using the external evaporator is carried out, and the defrosting mode is finished when a frost formation detection unit confirms that there is no frost formation.

According to the third aspect of the present invention, to finish the defrosting mode of the external evaporator, the heat-pump heating mode using the external evaporator is carried out, and the defrosting mode of the external evaporator is finished when a frost formation detection unit confirms that there is no frost formation. Therefore, the heat-pump heating mode can be carried out to confirm the completion of the defrosting when the frost formation detection unit determines that there is no frost formation on the external evaporator, that is, when the frost formation detection unit is not activated. As a result, the external evaporator can be surely defrosted without leaving the frost.

Advantageous Effects of Invention

According to the heat-pump automotive air conditioner of the present invention, minimal heating circuits and devices, such as the internal condenser, the first heating circuit between the inlet side of the external condenser and the receiver, and the second heating circuit including the second expansion valve and the external evaporator between the outlet side of the receiver and the suction side of the electric compressor, are connected to the discharge circuit of the refrigerant cycle for cooling as a prototype. In this way, the circuit sections and the devices with the same pressure conditions can be shared to form the heat pump cycle for heating. Therefore, a low-cost, highly reliable, highly efficient heat-pump automotive air conditioner with a relatively simple configuration and with excellent ease of mounting that can be suitably applied to electric vehicles and hybrid vehicles can be provided just by sharing the circuit sections and devices with the same pressure conditions as those of the cooling cycle of an existing automotive air conditioner applied to an ICEV system and by adding minimal heating circuits and devices with different pressure conditions, without newly developing circuits with specifications that can endure both the cooling and heating modes. Even if frost is formed on the external evaporator when the ambient temperature is low, the flow of the refrigerant to the second heating circuit can be cut off to distribute the refrigerant toward the internal evaporator, and the switch to the dehumidification heating using the internal evaporator is possible. Therefore, when the frost is formed on the external evaporator, the evaporator can be switched to the internal evaporator, and efficient heat-pump heating mode can be continued. Therefore, interruption of the heating mode or loss of power consumption by switching to the defrosting mode in the heating mode during running can be eliminated.

According to the defrosting method of the heat-pump automotive air conditioner of the present invention, even if frost is formed on the external evaporator during the heating mode, the defrosting mode is not performed when the vehicle is running, and the heating mode is continued by switching to the dehumidification heating using the internal evaporator. When there is no passenger after the termination of the vehicle, the automotive air conditioner is operated in the cooling cycle by setting the temperature regulation door of the HVAC unit to the maximum cooling position and setting the inside/outside air switch door to the inside air circulation mode. In this way, warm air heated by hot gas distributed to the external condenser can be used to melt the frost and defrost the external evaporator. Therefore, defrosting is possible without supplying the high-pressure hot gas to the external evaporator on which the frost is formed. New development of the refrigerant circuits and devices with specifications that can endure the circulation of refrigerants at high and low pressures is not necessary. In the defrosting, the temperature regulation door of the HVAC unit is set to the maximum cooling position, and the inside/outside air switch door is set to the inside air circulation mode. The internal air is used as the heat source, and the heat of the hot gas can be effectively used for the defrosting while eliminating the heat release loss in the internal condenser. Therefore, defrosting is possible in a relatively short time.

DESCRIPTION OF EMBODIMENTS

First Embodiment

A first embodiment of the present invention will now be described with reference to FIGS. 1 to 2C.

Figure 1:
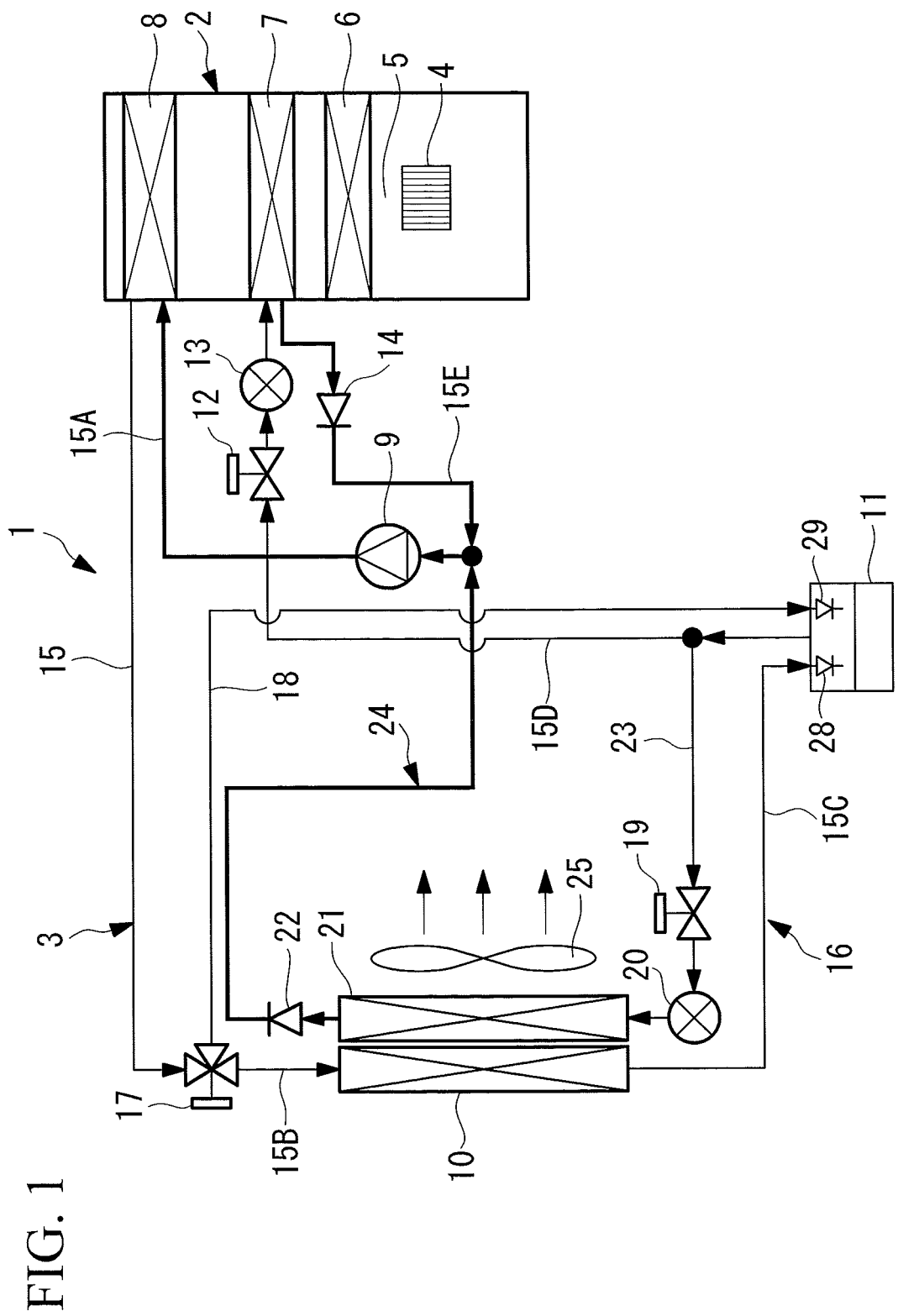
FIG. 1 is a refrigerant circuit diagram of a heat-pump automotive air conditioner according to an embodiment of the present invention.
Figure 2A:
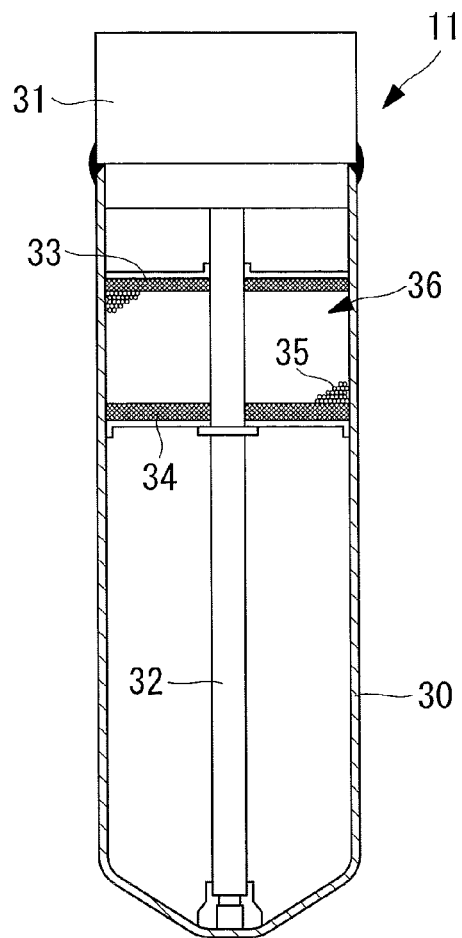
FIG. 2A is a vertical sectional view of a receiver incorporated into the heat-pump automotive air conditioner shown in FIG. 1.
Figure 2B:
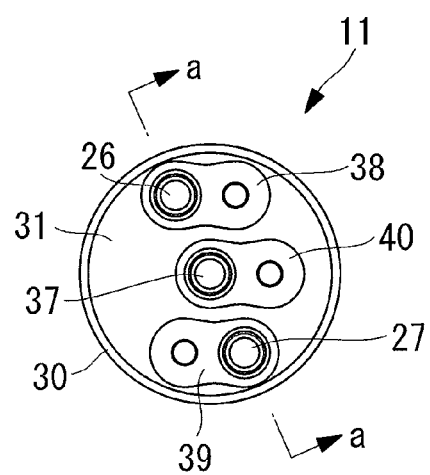
FIG. 2B is a plan view of the receiver incorporated into the heat-pump automotive air conditioner shown in FIG. 1.

FIG. 1 shows a refrigerant circuit diagram of a heat-pump automotive air conditioner according to an embodiment of the present invention. FIGS. 2A, 2B, and 2C show block diagrams of a receiver incorporated into the heat-pump automotive air conditioner. A heat-pump automotive air conditioner 1 of the present embodiment includes an HVAC unit (Heating Ventilation and Air Conditioning Unit) 2 and a heat pump cycle 3 capable of cooling and heating.

The HVAC unit 2 includes: a blower 4 that switches and introduces one of inside air from the vehicle interior and outside air and that feeds the air to the downstream by pressure; and an auxiliary electric heater (for example, PTC heater) 6, an internal evaporator 7, and an internal condenser 8 sequentially arranged from the upstream to the downstream in an air duct 5 connected to the blower 4. The HVAC unit 2 is usually installed in an instrument panel on the front side of the vehicle interior and is configured to selectively blow off airflow temperature-regulated by the auxiliary electric heater 6, the internal evaporator 7, and the internal condenser 8 from a plurality of blowoff ports opened toward the vehicle interior to adjust the vehicle interior to a preset temperature.

A door (not shown) that can shield ventilation is arranged for the internal condenser 8 installed in the HVAC unit 2. In a cooling mode, cool air cooled by the internal evaporator 7 can be blown off to the vehicle interior bypassing the internal condenser 8. In a dehumidification mode, the internal condenser 8 can reheat the cool air cooled by the internal evaporator 7 and blow off the air to the vehicle interior.

The heat pump cycle 3 capable of cooling and heating includes a refrigerant cycle (refrigerant circuit) 16 for cooling of a closed cycle, to which an electric compressor 9 that compresses a refrigerant, an external condenser 10, a receiver 11, a first solenoid valve 12, a first expansion valve 13, the internal evaporator 7, and a check valve 14 are connected in this order through refrigerant piping 15. The refrigerant cycle 16 for cooling is similar to an existing automotive air conditioner applied to an ICEV system.

To the heat pump cycle 3, the internal condenser 8 installed in the HVAC unit 2 is further connected to discharge piping (refrigerant piping) 15A from the electric compressor 9. A tree-way switch valve (switching unit) 17 is arranged on inlet-side refrigerant piping 15B of the external condenser 10, and a first heating circuit 18 that guides the refrigerant condensed by the internal condenser 8 to the receiver 11 through the three-way switch valve 17 is connected. A second heating circuit 23, in which a second solenoid valve 19, a second expansion valve 20, an external evaporator 21, and a check valve 22 are sequentially arranged, is connected between outlet piping (refrigerant piping) 15D of the receiver 11 and intake piping (refrigerant piping) 15E to the electric compressor 9.

This can form the heat pump cycle (refrigerant circuit) 24 for heating of the closed cycle, to which the electric compressor 9, the internal condenser 8 installed in the HVAC unit 2, the three-way switch valve 17, the first heating circuit 18, the receiver 11, and the second heating circuit 23 provided with the second solenoid valve 19, the second expansion valve 20, the external evaporator 21, and the check valve 22 are connected through the refrigerant piping 15 in this order.

In the heat pump cycle 3, the external evaporator 21 constituting the heat pump cycle 24 for heating is installed in parallel with the external condenser 10 constituting the refrigerant cycle 16 for cooling, in the air duct of the external fan 25 that ventilates the outside air. The external evaporator 21 and the external condenser 10 share the external fan 25. In the present embodiment, although the external evaporator 21 is installed on the downstream of the external condenser 10, the opposite is possible.

Figure 2C:
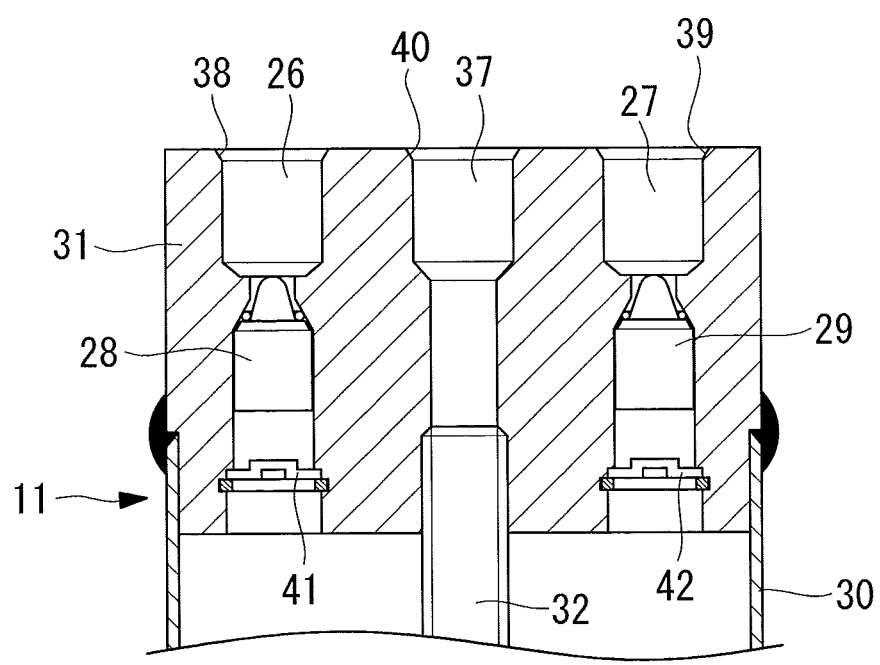
FIG. 2C is an a-a cross-sectional view of FIG. 2B.

As shown in FIGS. 2A to 2C, the receiver 11 of the present embodiment is a receiver 11 with check valves including check valves 28 and 29 integrally incorporated into two refrigerant inlets 26 and 27, respectively, to which refrigerant piping 15C from the external condenser 10 and the first heating circuit 18 are connected. The receiver 11 with check valves is a receiver 11 with check valves embedded with a dryer, the receiver 11 including: a cylindrical main body 30 with a bottom; a lid 31 welded to an opening of one end of the main body 30; a refrigerant outflow pipe 32, in which one end is connected to the lid 31, and the other end is extended near the bottom section of the main body 30; and a dryer 36 formed by filling a desiccant 35 between a pair of up and down filters 33 and 34 installed at an upper section in the main body 30.

The lid 31 is provided with the two refrigerant inlets 26 and 27, to which the refrigerant piping 15C and the first heating circuit 18 are connected as described above, and a refrigerant outlet 37, to which the refrigerant outflow pipe 32 is connected. Fitting sections 38, 39, and 40 for connecting refrigerant piping are arranged on the refrigerant inlets 26, 27, and the refrigerant outlet 37, respectively, and the refrigerant piping 15C, 15D, and the first heating circuit 18 are connected through the fitting sections 38, 39, and 40. The check valves 28 and 29 are incorporated into the refrigerant inlets 26 and 27 through retaining rings and stoppers 41 and 42.

In the present embodiment, automatic thermal expansion valves are used for the first expansion valve 13 and the second expansion valve 20, and the first solenoid valve 12 and the second solenoid valve 19 are arranged on the inlet sides, respectively. However, in place of the first solenoid valve 12 and the first expansion valve 13 as well as the second solenoid valve 19 and the second expansion valve 20, an electronic expansion valve may be installed for each.

According to the present embodiment, the following effects are attained.

During cooling mode in the heat-pump automotive air conditioner 1, the refrigerant compressed by the electric compressor 9 is circulated by the discharge piping (refrigerant piping) 15A to the external condenser 10 through the internal condenser 8 and the three-way switch valve 17. The heat is exchanged with the outside air ventilated to the external fan 25, and the refrigerant is condensed to a liquid. The liquid refrigerant is introduced to the receiver 11 through the refrigerant piping 15C and the check valve 28 and is temporarily stored there. The liquid refrigerant is guided to the first expansion valve 13 through the refrigerant piping 15D and the first solenoid valve 12 and is decompressed to enter a gas-liquid two-phase state and supplied to the internal evaporator 7.

The refrigerant evaporated to a gas after heat exchange with the inside air or the outside air transferred from the blower 4 in the internal evaporator 7 is introduced to the electric compressor 9 through the check valve 14 and compressed again. Hereafter, similar cycles are repeated. The cooling cycle is not different in any way from the cooling cycle of an existing automotive air conditioner used in an ICEV system, and the cooling cycle can be shared. The inside air or the outside air cooled by the heat exchange with the refrigerant in the internal evaporator 7 is blown off to the vehicle interior and supplied for cooling the vehicle interior.

In the cooling mode, the ventilation to the internal condenser 8 is shielded by the door, and the cool air cooled by the internal evaporator 7 is directly blown off to the vehicle interior. Therefore, the refrigerant is barely condensed in the internal condenser 8 and circulated to the external condenser 10. The heat is exchanged with the outside air in the external condenser 10, and the refrigerant is condensed to a liquid.

The door arranged on the inlet of the internal condenser 8 can be opened during the drive in the cooling cycle to ventilate the cool air cooled by the internal evaporator 7 to the internal condenser 8, and the cool air can be reheated. As a result, reheating dehumidification drive can be performed.

Meanwhile, in the heating mode, the refrigerant compressed by the electric compressor 9 is introduced to the internal condenser 8 by the discharge piping (refrigerant piping) 15A. In the internal condenser 8, the heat is exchanged with the inside air or the outside air transferred from the blower 4, and the heat is released. In this way, the heated air is blown off to the vehicle interior and is supplied for heating the vehicle interior. The refrigerant condensed to a liquid after the heat release is guided to the first heating circuit 18 by the three-way switch valve 17 and is introduced to the receiver 11 through the check valve 29. The temporarily stored refrigerant is guided to the second heating circuit 23 through the refrigerant piping 15D and decompressed while being passed through the second solenoid valve 19 and the second expansion valve 20 to enter a gas-liquid two-phase state. The refrigerant is supplied to the external evaporator 21.

The heat of the refrigerant is exchanged with the outside air ventilated by the external fan 25 in the external evaporator 21, and the heat is absorbed from the outside air. The refrigerant is evaporated to a gas and introduced to the electric compressor 9 through the check valve 22. The refrigerant is compressed again. Hereafter, similar cycles are repeated, and the heat pump cycle 24 for heating performs heat pump heating.

In this way, minimal heating circuits and devices, such as the internal condenser 8, the first heating circuit 18 between the three-way switch valve 17 arranged on the inlet side of the external condenser 10 and the receiver 11, and the second heating circuit 23 provided with the second expansion valve 20 and the external evaporator 21 between the outlet side of the receiver 11 and the suction side of the electric compressor 9, are connected to the discharge piping (refrigerant piping) 15A of the refrigerant cycle 16 for cooling as a prototype. The circuit sections and devices with the same pressure conditions can be shared to form a heat pump cycle for heating.

Therefore, a low-cost, highly reliable heat-pump automotive air conditioner 1 with excellent ease of mounting that can be suitably applied to electric vehicles and hybrid vehicles can be provided just by sharing the circuit sections and devices with substantially the same pressure conditions as those of the cooling cycle of an existing automotive air conditioner used in an ICEV system and by adding minimal heating circuits and devices with different pressure conditions, without newly developing circuits with specifications that can endure both the cooling and heating modes.

The external evaporator 21 is installed in parallel with the external condenser 10 in the air duct of the external fan 25 that ventilates the outside air to the external condenser 10. The external fan 25 ventilates the outside air during heating, and the heat pump heating is performed by heat absorption from the outside air. Therefore, the external fan 25 can be shared to reduce the number of components. The configuration of the heat-pump automotive air conditioner 1 can be simplified and downsized, and the cost can be reduced.

The receiver 11 is a receiver with check valves, in which the check valves 28 and 29 are integrally incorporated into the refrigerant inlets 26 and 27. In this way, the check valves 28 and 29 incorporated into the refrigerant inlets 26 and 27 of the receiver 11 can cut off the refrigerant cycle 16 for cooling or the heat pump cycle 24 for heating not used depending on the operating mode. Therefore, connection components, such as a flange, are not necessary as compared to a system including the receiver 11 and the check valves 28 and 29 individually arranged in the refrigerant circuit. The refrigerant circuit can be simplified, and the cost can be reduced. The receiver 11 includes the dryer 36 in the present embodiment. However, the receiver 11 may not necessarily include the dryer 36, and it is obvious that the dryer may not be included.

In the present embodiment, the first expansion valve 13 and the second expansion valve 20 are automatic thermal expansion valves, and the first solenoid valve 12 and the second solenoid valve 19 are arranged on the inlet sides. This allows automatic control for maintaining the degree of superheat at the evaporator outlet of the refrigerant evaporated by the internal evaporator 7 during cooling and by the external evaporator 21 during heating. Therefore, the control system can be simplified as compared to when electronic expansion valves that require a refrigerant pressure detection unit and a refrigerant temperature detection unit are used. The cost can be reduced, and the reliability can be improved.

The refrigerant circuit not used depending on the operating mode can be closed by the first solenoid valve 12 and the second solenoid valve 19 arranged on the inlet sides of the first expansion valve 13 and the second expansion valve 20. Therefore, the circuit to be paused can be surely fully closed, and staying of the refrigerant and the like can be prevented.

However, in the present embodiment, regardless of the description above, the electronic expansion valve can replace each of the first solenoid valve 12, the first expansion valve 13, the second solenoid valve 19, and the second expansion valve 20. In this way, the electronic expansion valves arranged in the circuit to be paused can be fully closed, and staying of the refrigerant in the external evaporator 21 paused during cooling or in the internal evaporator 7 paused during heating can be prevented. Therefore, the installment of the solenoid valves and the like for fully closing the paused circuit can be omitted. The refrigerant circuit can be simplified, and the cost can be reduced.

In the present embodiment, the check valves 22 and 14 are respectively arranged on the second heating circuit 23 and the refrigerant piping 15E for connection between the external evaporator 21 as well as the internal evaporator 7 and the suction side of the electric compressor 9. Therefore, the check valves 22 and 14 can cut off between the external evaporator 21 or the internal evaporator 7 paused depending on the operating mode and the suction side of the electric compressor 9. Therefore, the function of the pausing external evaporator 21 or the internal evaporator 7 can be surely terminated.

In the present embodiment, the auxiliary electric heater 6 for heating including a PTC heater and the like is installed in the HVAC unit 2. Therefore, in a situation that the heating performance is insufficient, such as when the ambient temperature is low, when heating is started, and when the window is frosted, the auxiliary electric heater 6 can be temporarily operated at the same time as the heat-pump heating mode to increase the blowoff air temperature to supplement the insufficiency in the heating performance. Therefore, the maximum required heating performance can be increased. The utilization rate of the auxiliary electric heater 6 can be reduced compared to the heating mode using the electric heater as a main heat source, and highly efficient drive is possible. A reduction in the vehicle drive distance due to an increase in the heating power consumption can be suppressed.

The present invention is not limited to the invention according to the embodiment described above, and various modifications can be made as necessary without departing from the scope of the present invention. For example, the HVAC unit 2 may be an HVAC of an air mix system including an air mix door for temperature regulation on the downstream of the internal evaporator 7. The three-way switch valve 17 may be replaced by two solenoid valves or by a four-way switch valve.

In the embodiment described above, the first solenoid valve 12 and the second solenoid valve 19 are arranged on the inlet sides of the first expansion valve 13 and the second expansion valve 20. However, it is obvious that the first solenoid valve 12 and the first expansion valve 13 as well as the second solenoid valve 19 and the second expansion valve 20 may be integrated automatic thermal expansion valves with solenoid open/close valves. The external evaporator 21 may be disposed in association with the heat releasing radiator to allow absorbing heat discharged from the vehicle drive motor, the inverter, the battery, and the like.

Second Embodiment

An embodiment of the present invention will be described with reference to FIGS. 3 to 12.

Figure 3:
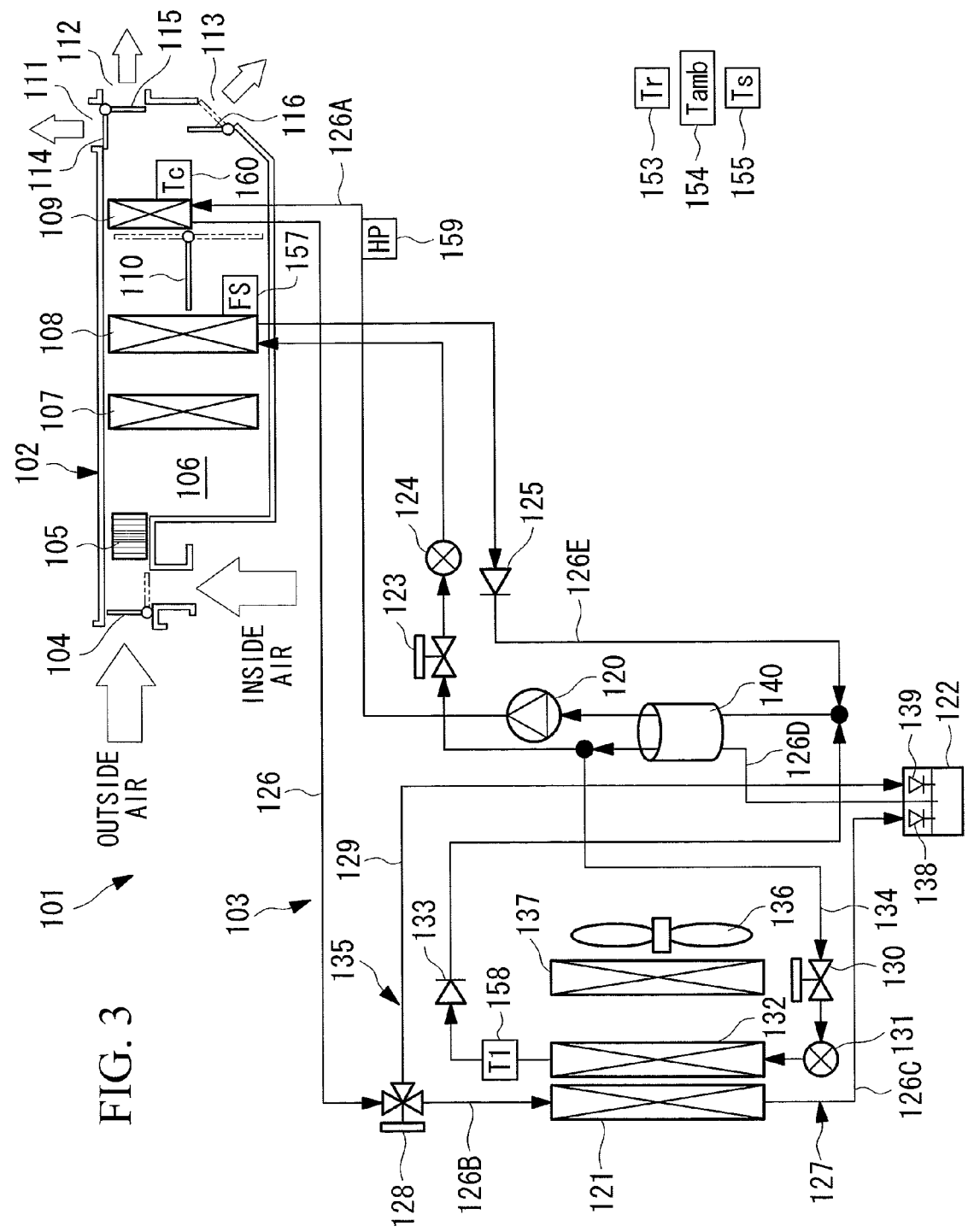
FIG. 3 is a refrigerant circuit diagram of a heat-pump automotive air conditioner according to an embodiment of the present invention.

FIG. 3 shows a refrigerant circuit diagram of a heat-pump automotive air conditioner according to an embodiment of the present invention.

A heat-pump automotive air conditioner 101 according to the present embodiment includes an HVAC unit (Heating Ventilation and Air Conditioning Unit) 102 and a heat pump cycle 103 capable of cooling and heating.

The HVAC unit 102 includes: a blower 105 that switches and introduces one of the inside air from the vehicle interior and the outside air through an inside/outside air switch door 104 and that feeds the air to the downstream by pressure; an auxiliary electric heater (for example, PTC heater) 107 for heating sequentially disposed from the upstream to the downstream in an air duct 106 connected to the blower 105; an internal evaporator 108; an internal condenser 109; and a temperature regulation door 110. The HVAC unit 102 is installed in an instrument panel on the front side of the vehicle and is configured to blow off air temperature-regulated by the auxiliary electric heater 107, the internal evaporator 108, and the internal condenser 109 from one of a plurality of blow off ports, such as a def blowoff port 111, a face blowoff port 112, and a foot blow off port 113, that are open toward the vehicle interior, to the vehicle interior in accordance with a blowoff mode switched by blowoff mode switch doors 114, 115, and 116, to adjust the vehicle interior to a preset temperature.

The heat pump cycle 103 capable of cooling and heating includes a refrigerant cycle (refrigerant circuit) 127 for cooling of a closed cycle, to which an electric compressor 120 that compresses a refrigerant, an external condenser 121, a receiver 122, a first solenoid valve 123, a first expansion valve 124, the internal evaporator 108, and a check valve 125 are connected in this order through refrigerant piping 126. The refrigerant cycle 127 for cooling is similar to that of an existing automotive air conditioner applied to an ICEV system.

In the heat pump cycle 103, the internal condenser 109 installed in the HVAC unit 102 is connected to discharge piping (refrigerant piping) 126A from the electric compressor 120, in the refrigerant cycle 127 for cooling as a prototype. A three-way switch valve (switching unit) 128 is arranged on inlet piping (refrigerant piping) 126B of the external condenser 121, and a first heating circuit 129 that guides the refrigerant condensed by the internal condenser 109 to the receiver 122 through the three-way switch valve 128 is connected. A second heating circuit 134, on which a second solenoid valve 130, a second expansion valve 131, an external evaporator 132, and a check valve 133 are sequentially arranged, is connected between outlet piping (refrigerant piping) 126D of the receiver 122 and intake piping (refrigerant piping) 126E to the electric compressor 120.

This can form the heat pump cycle (refrigerant circuit) 135 for heating of a closed cycle, to which the electric compressor 120, the internal condenser 109 installed in the HVAC unit 102, the three-way switch valve 128, the first heating circuit 129, the receiver 122, and the second heating circuit 134 including the second solenoid valve 130, the second expansion valve 131, the external evaporator 132, and the check valve 133 are connected through the refrigerant piping 126 in this order. A combination of two solenoid valves may replace the three-way switch valve 128.

In the heat pump cycle 103, the external evaporator 132 constituting the heat pump cycle 135 for heating is arranged on the downstream in the air duct of the external fan 136 that ventilates the outside air and in parallel with the external condenser 121 constituting the refrigerant cycle 127 for cooling, and the external fan 136 is shared. A radiator 137 is further installed on the downstream of the external evaporator 132 in the present embodiment, the radiator 137 releasing heat of a heating medium (such as cooling water) for cooling heating elements, such as an engine, a motor, an inverter, and a battery, for driving the vehicle. The external evaporator 132 may be installed on the downstream of the radiator 137.

As shown in FIG. 3, the receiver 122 of the present embodiment is a receiver 122 with check valves including check valves 138 and 139 integrally incorporated into two refrigerant inlets, to which refrigerant piping 126C from the external condenser 121 and the first heating circuit 129 are connected. An internal heat exchanger 140 that exchanges heat of a high-pressure liquid refrigerant distributed in the outlet piping (refrigerant piping) 126D and a low-pressure gas refrigerant distributed in the intake piping (refrigerant piping) 126E to supercool the high-pressure liquid refrigerant is arranged between the output piping (refrigerant piping) 126D of the receiver 122 and the intake piping (refrigerant piping) 126E to the electric compressor 120.

In the present embodiment, automatic thermal expansion valves are used for the first expansion valve 124 and the second expansion valve 131, and the first solenoid valve 123 and the second solenoid valve 130 for opening and closing the refrigerant circuit are arranged on the inlet sides of the valves, respectively. However, an electronic expansion valve with functions of open/close valves may replace each of the first solenoid valve 123 and the first expansion valve 124 as well as the second solenoid valve 130 and the second expansion valve 131.

Flows of the refrigerant during the drive of the heat-pump automotive air conditioner 101 will be described with reference to FIGS. 4 to 7. In FIGS. 4 to 7, refrigerant flow paths during the drive are indicated by thick lines.

[Cooling Mode]

Figure 4:
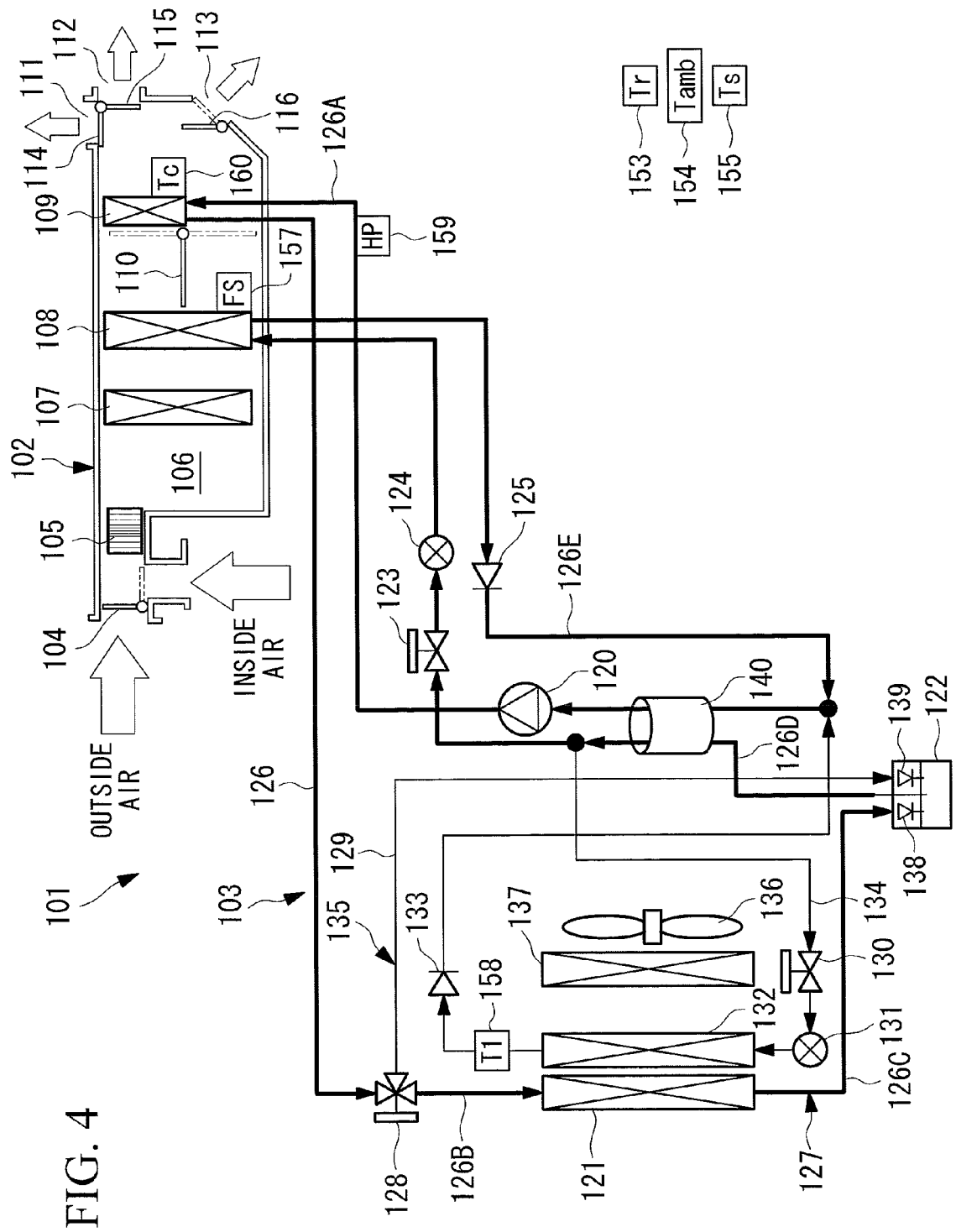
FIG. 4 is a refrigerant circuit diagram showing a flow of a refrigerant during cooling mode by the heat-pump automotive air conditioner shown in FIG. 3.

In the cooling mode, the refrigerant compressed by the electric compressor 120 is circulated from the discharge piping (refrigerant piping) 126A to the external condenser 121 through the internal condenser 109 and the three-way switch valve 128 as shown in FIG. 4. The heat is exchanged with the outside air ventilated through the external fan 136, and the refrigerant is condensed to a liquid. The liquid refrigerant is introduced to the receiver 122 through the refrigerant piping 126C and the check valve 138 and is temporarily stored. The liquid refrigerant is guided to the first expansion valve 124 through the refrigerant piping 126D, the internal heat exchanger 140, and the first solenoid valve 123. The liquid refrigerant is decompressed to enter a gas-liquid two-phase state and is supplied to the internal evaporator 108. In the distribution through the internal heat exchanger 140, the heat of the high-pressure liquid refrigerant is exchanged with the low-pressure gas refrigerant evaporated by the internal evaporator 108, and the refrigerant is supercooled.

The refrigerant evaporated to a gas after the heat exchange with the inside air or the outside air transferred from the blower 105 in the internal evaporator 108 is introduced to the electric compressor 120 through the check valve 125 and the internal heat exchanger 140 and is compressed again. Hereafter, similar cycles are repeated. The cooling cycle 127 is similar to the cooling cycle of an existing automotive air conditioner used in an ICEV system, and the cooling cycle can be shared. The inside air or the outside air cooled by the heat exchange with the refrigerant in the internal evaporator 108 is blown off to the vehicle interior from one of the def blowoff port 111, the face blowoff port 112, and the foot blowoff port 113 according to the blowoff mode switched by the blowoff mode switch doors 114, 115, and 116 and is supplied for cooling the vehicle interior.

In the cooling mode, the ventilation to the internal condenser 109 is cut off by the temperature regulation door 110, and the cool air cooled by the internal evaporator 108 is directly blown off to the vehicle interior. Therefore, the refrigerant is barely condensed by the internal condenser 109 and is circulated to the external condenser 121. The heat of the refrigerant is exchanged with the outside air by the external condenser 121 and is condensed to a liquid. Meanwhile, the temperature regulation door 110 arranged on the inlet of the internal condenser 109 is opened during the drive in the cooling cycle 127, and part of the cool air cooled by the internal evaporator 108 is ventilated to the internal condenser 109 to reheat the air. In this way, reheating dehumidification drive can be performed.

[Heating Mode (Before Frost Formation)]

Figure 5:
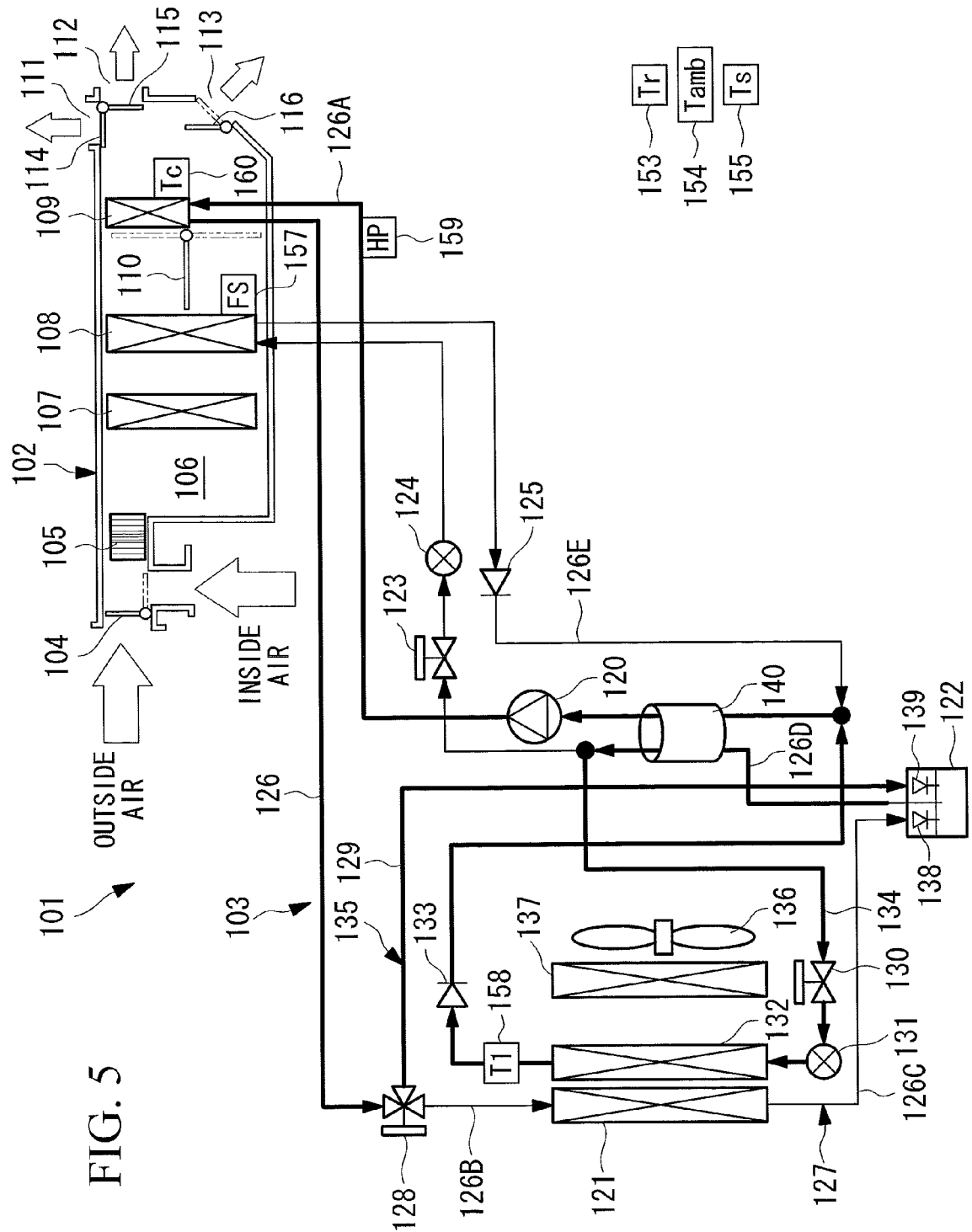
FIG. 5 is a refrigerant circuit diagram showing a flow of the refrigerant during heating mode (before frost formation) by the heat-pump automotive air conditioner shown in FIG. 3.

In the heating mode, before frost is formed on the external evaporator 132, the refrigerant compressed by the electric compressor 120 is introduced to the internal condenser 109 by the discharge piping (refrigerant piping) 126A as shown in FIG. 5. In the internal condenser 109, the heat is exchanged with the inside air or the outside air transferred from the blower 105, and the heat is released. The heated air is blown off to the vehicle interior from one of the def blowoff port 111, the face blowoff port 112, and the foot blowoff port 113 according to the blowoff mode and is supplied for heating the vehicle interior. Normal heating mode is performed in an outside air intake mode to prevent window fogging.

The refrigerant heat-released and condensed to a liquid by the internal condenser 109 is guided to the first heating circuit 129 through the three-way switch valve 128 and introduced to the receiver 122 through the check valve 139. The temporarily stored refrigerant is guided to the second heating circuit 134 through the refrigerant piping 126D and the internal heat exchanger 140 and decompressed while being passed through the second solenoid valve 130 and the second expansion valve 131 to enter a gas-liquid two-phase state. The refrigerant is supplied to the external evaporator 132. In the distribution through the internal heat exchanger 140, the heat of the high-pressure liquid refrigerant is exchanged with the low-pressure gas refrigerant evaporated by the external evaporator 132, and the refrigerant is supercooled.

The heat of the refrigerant supplied to the external evaporator 132 is exchanged with the outside air ventilated by the external fan 136 in the external evaporator 132. The heat is absorbed from the outside air, and the refrigerant is evaporated to a gas. The refrigerant is introduced to the electric compressor 120 through the check valve 133 and the internal heat exchanger 140 and is compressed again. Hereafter, similar cycles are repeated, and heat pumping heating is performed by the heat pump cycle 135 for heating. If the internal temperature does not sufficiently rise due to insufficiency in the heating performance, the auxiliary electric heater 6 can be energized to supplement the heating performance.

In this way, minimal heating circuits and devices, such as the internal condenser 109, the first heating circuit 129 between the three-way switch valve 128 arranged on the inlet side of the external condenser 121 and the receiver 122, and the second heating circuit 134 provided with the first solenoid valve 130, the second expansion valve 131, and the external evaporator 132 between the output side of the receiver 122 and the suction side of the electric compressor 120, are connected to the discharge piping (refrigerant piping) 126A of the refrigerant cycle 127 for cooling as a prototype. The circuit sections and devices with the same pressure conditions can be shared to form the heat pump cycle 135 for heating.

[Heating Mode (after Frost Formation)]

Figure 6:
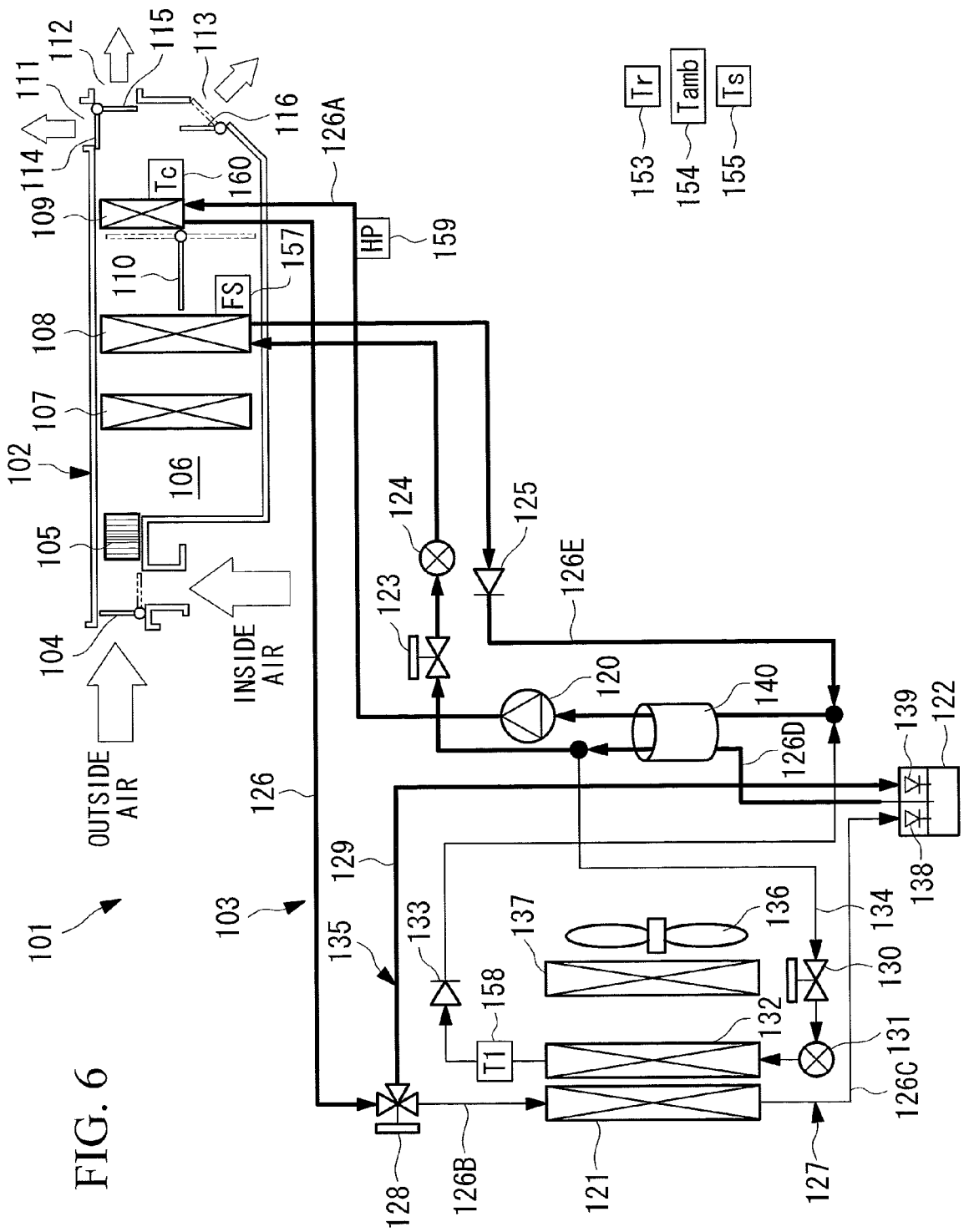
FIG. 6 is a refrigerant circuit diagram showing a flow of the refrigerant during heating mode (after frost formation) by the heat-pump automotive air conditioner shown in FIG. 3.

If the external evaporator 132 is operated as an evaporator to absorb heat from the outside air to perform the heating mode as described above, frost may be formed on the surface of the external evaporator 132 when the ambient temperature is low. The heating performance may be reduced with progress in the frost formation, and heating may be impossible. Therefore, in the present embodiment, the first solenoid valve 123 is opened, and the second solenoid valve 130 is closed as shown in FIG. 6 when frost formation is detected for the external evaporator 132. The cycle is switched to the heat pump cycle for heating 135 using the internal evaporator 108.

In this case, the refrigerant compressed by the electric compressor 120 is first introduced to the internal condenser 109 by the discharge piping (refrigerant piping) 126A as in the heating mode before the frost formation. In the internal condenser 109, the heat is exchanged with the inside air or with mixed air of inside and outside air transferred from the blower 105, and the heat is released. The heated air is blown off to the vehicle interior from one of the def blowoff port 111, the face blowoff port 112, and the foot blowoff port 113 according to the blowoff mode and is supplied for heating the vehicle interior. In this way, the heating mode after the frost is formed on the external evaporator 132 is switched to the dehumidification heating mode in which the internal evaporator 108 serves as the evaporator. Therefore, there is no need to worry about the window fogging, and thus, and the mode is switched to the inside air circulation mode or the inside air/outside air mixed mode in the drive to allow heating by the heat absorption from the internal air at a high temperature.

The refrigerant heat-released and condensed to a liquid by the internal condenser 109 is guided to the first heating circuit 129 through the three-way switch valve 128 and introduced to the receiver 122 through the check valve 139. The temporarily stored refrigerant is guided to the first expansion valve 124 through the refrigerant piping 126D, the internal heat exchanger 140, and the first solenoid valve 123 and is decompressed to enter a gas-liquid two-phase state. The refrigerant is supplied to the internal evaporator 108. In the distribution through the internal heat exchanger 140, the heat of the high-pressure liquid refrigerant is exchanged with the low-pressure gas refrigerant evaporated by the internal evaporator 108, and the refrigerant is supercooled.

The refrigerant heat-exchanged with the inside air transferred from the blower 105 and evaporated to a gas by the internal evaporator 108 is introduced to the electric compressor 120 through the check valve 125 and the internal heat exchanger 140 and is compressed again. Hereafter, similar cycles are repeated. The air (inside air) cooled and dehumidified by the heat absorption by the refrigerant in the internal evaporator 108 is heated by the internal condenser 109 installed on the downstream of the internal evaporator 108 as described above. The air is blown off to the vehicle interior from one of the def blowoff port 111, the face blowoff port 112, and the foot blowoff port 113 and is supplied for heating the vehicle interior. As described, after the frost is formed on the external evaporator 132, the dehumidification heating mode using the internal evaporator 108 as the evaporator is performed.

[Defrosting Mode]

As described, the defrosting mode is not immediately performed even if the frost formation is detected for the external evaporator 132 when the heating mode is performed by operating the external evaporator 132. The drive is switched to the dehumidification heating mode using the internal evaporator 108, and the heating mode is continued. Therefore, mandatory defrosting is not performed when the vehicle is running (used), and natural defrosting by the outside air is waited. However, the frost is expected to remain attached without being defrosted if the low ambient temperature continues.

Figure 7:
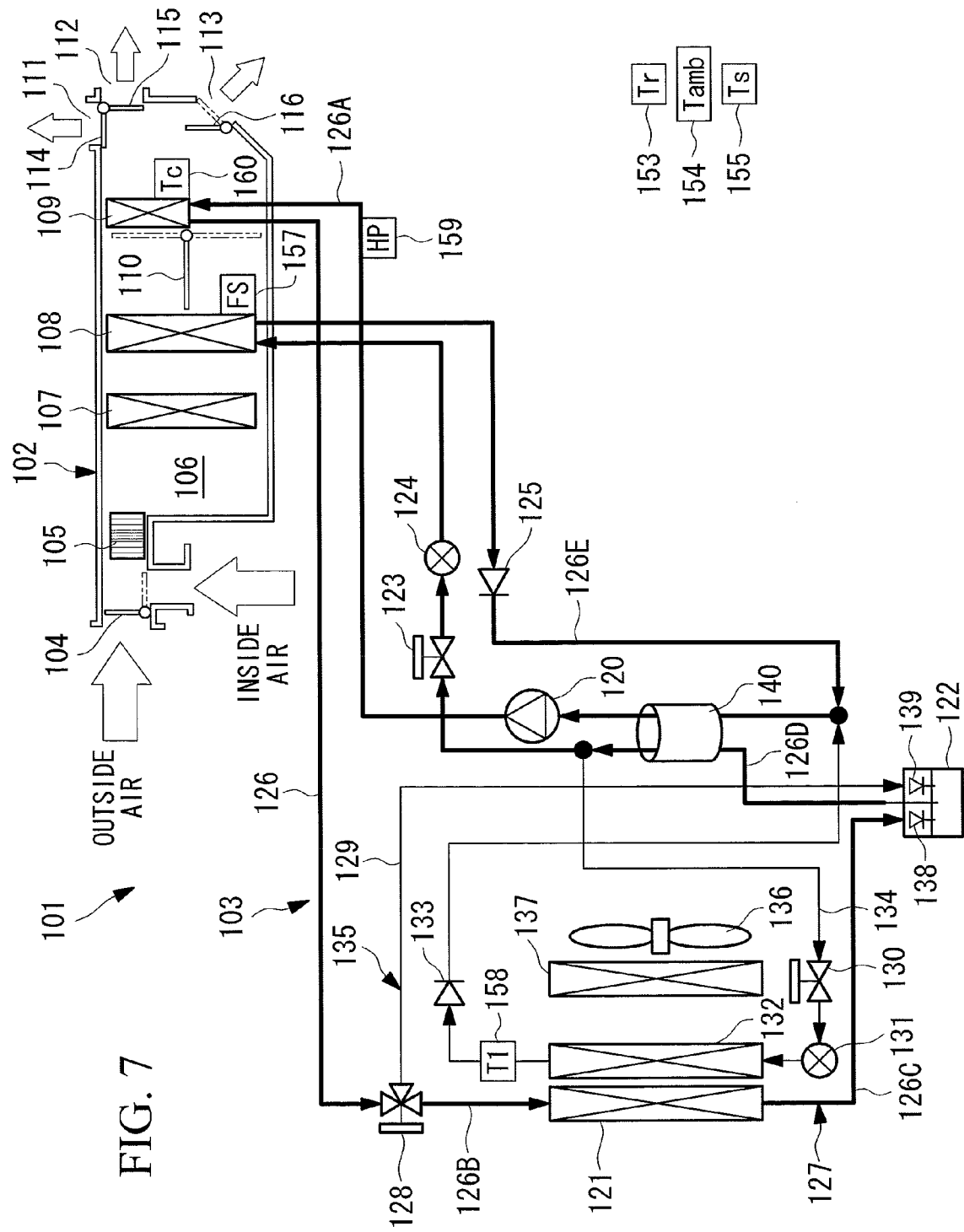
FIG. 7 is a refrigerant circuit diagram showing a flow of the refrigerant during defrosting mode by the heat-pump automotive air conditioner shown in FIG. 3.

Therefore, when the vehicle is terminated (parked), and there is no passenger, or desirably, when there is enough battery capacity during or after charge of the vehicle battery, the air conditioner 101 is operated to perform the defrosting mode. As shown in FIG. 7, the defrosting mode is performed by circulating the hot gas refrigerant compressed by the electric compressor 120 to the external condenser 121 through the internal condenser 109 and the three-way switch valve 128 by the discharge piping (refrigerant piping) 126A and releasing the heat to the outside air ventilated through the external fan 136. The outside air heated by the heat release from the hot gas refrigerant becomes warm air and is blown against the external evaporator 132 disposed on the downstream of the external condenser 121 to melt the frost.

The refrigerant heat-released and condensed by the external condenser 121 reaches the first expansion valve 124 through the refrigerant piping 126C, the receiver 122, the refrigerant piping 126D, the internal heat exchanger 140, and the first solenoid valve 123. The refrigerant is decompressed at the first expansion valve 124 and is supplied to the internal evaporator 108. The gas-liquid two-phase refrigerant supplied to the internal evaporator 108 absorbs heat from the internal air (inside air) circulated through the blower 105 and is evaporated. The refrigerant is sucked in to the electric compressor 120 through the check valve 125 and the internal heat exchanger 140. Hereafter, the cooling cycle 127 is repeated to use the heat of the hot gas refrigerant released by the external condenser 121 to indirectly melt the frost and defrost the external evaporator 132.

Therefore, even in the defrosting mode, defrosting is possible without distributing the high-pressure hot gas refrigerant to the external evaporator 132 with low-pressure specifications. The defrosting mode is performed without the passenger. Therefore, the internal air conditioning state or the blowoff mode does not specifically have to be taken into account in the HVAC unit 102, and an optimal mode conforming to the defrosting can be set for the drive. In the present embodiment, the inside/outside air switch door 104 is set to the inside air circulation mode to allow the internal evaporator 108 to absorb heat from air at as high temperature as possible, and the temperature regulation door 110 is set to a maximum cooling position (MAX COOL position) for the defrosting mode to reduce the heat loss caused by the heat release by the internal condenser 109.

As for the blowoff mode, if the foot mode is selected to blow off the air from the foot blowoff port 113, the air blown off from the foot blowoff port 113 may short circuit to a suction port for inside air circulation opened near the foot blowoff port 113, and the suction of the internal air at a high temperature may be difficult. Therefore, in the defrosting mode, one of the def mode, the face mode, and the bilevel mode other than the foot mode is selected for the blowoff mode.

As for the end of the defrosting mode, the heat-pump heating mode (heating mode before the frost formation) using the external evaporator 132 is carried out, and the defrosting mode is finished at the confirmation by a frost formation unit (determined by whether a temperature difference between an external evaporator refrigerant temperature sensor (T1) 158 and an ambient temperature sensor (Tabm) 154 is equal to or greater than a predetermined value a) that there is no frost formation. More specifically, the completion of the defrosting is confirmed by the fact that the frost formation detection unit is not activated, and the external evaporator 132 can be surely defrosted without leaving the frost.

Figure 8:
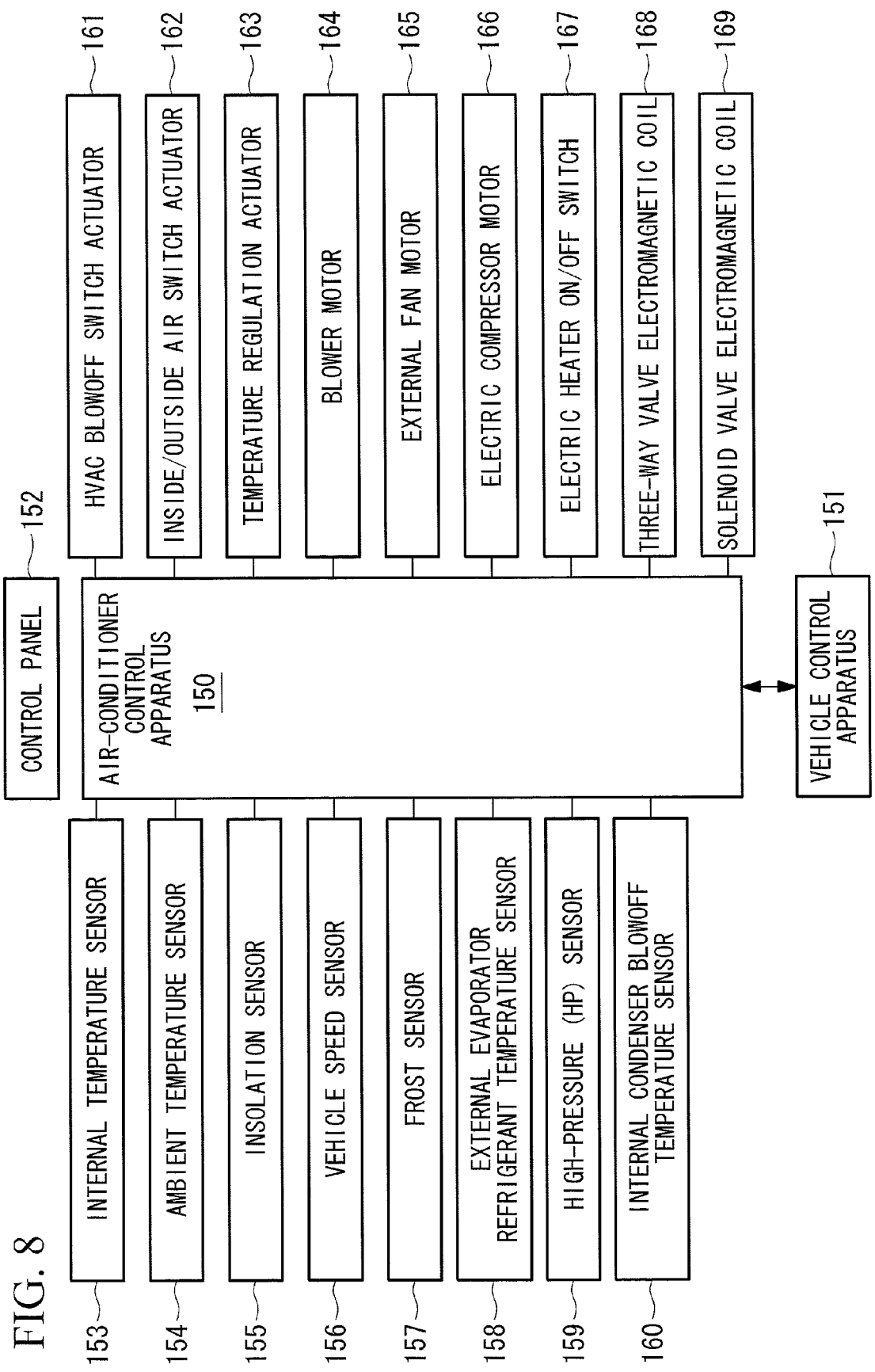
FIG. 8 is a block diagram of a control apparatus that controls the heat-pump automotive air conditioner shown in FIG. 3.

The drive described above is controlled through an air conditioner control apparatus (air-conditioner control apparatus) 150 shown in FIG. 8. The air conditioner control apparatus 150 is connected to a higher control apparatus (vehicle control apparatus) 151 of the vehicle, and related information can be input from the vehicle. The air conditioner control apparatus 150 includes a control panel 152 and is configured to control the drive of the automotive air conditioner 101 based on detection signals from the following sensor group and based on input information from the higher control apparatus 151 and the control panel 152.

The air conditioner control apparatus 150 receives detection signals from: an internal temperature sensor (Tr) 153, the ambient temperature sensor (Iamb) 154, an insolation sensor (Ts) 155, and a vehicle speed sensor 156 arranged at proper locations of the vehicle; a frost sensor (FS) 157 installed on the internal evaporator 108 of the automotive air conditioner 101; the external evaporator refrigerant temperature sensor (T1) 158 installed on the external evaporator 132; a high-pressure sensor (HP) 159 installed on the discharge piping (refrigerant piping) 126A; an internal condenser blowoff temperature sensor (Tc) 160 installed on the internal condenser 109; and the like.

Based on the detection signals from the sensor group and the input information from the control panel 152 and the higher control apparatus 151 of the vehicle, the air conditioner control apparatus 150 executes required computations, processes, and the like according to preset programs. The air conditioner control apparatus 150 controls: an actuator (HVAC blowoff switch actuator) 161 for the blowoff mode switch doors 114, 115, and 116; an actuator (inside/outside air switch actuator) 162 for the inside/outside air switch door 104; an actuator (temperature regulation actuator) 163 for the temperature regulation door 110; a motor (blower motor) 164 for the blower 105; a motor (external fan motor) 165 for the external fan 136; a motor (electric compressor motor) 166 for the electric compressor 120; an on/off switch (electric heater on/off switch) 167 for the auxiliary electric heater 107; an electromagnetic coil (three-way valve electromagnetic coil) 168 for the three-way switch valve 128; an electromagnetic coil (solenoid valve electromagnetic coil) 169 for the solenoid valves 123 and 130; and the like. The air conditioner control apparatus 150 functions to control the drive of the automotive air conditioner 101 as described above.

The control of the drive of the automotive air conditioner 101 by the air conditioner control apparatus 150 will be described with reference to flow charts shown in FIGS. 9 to 12.

Figure 9:
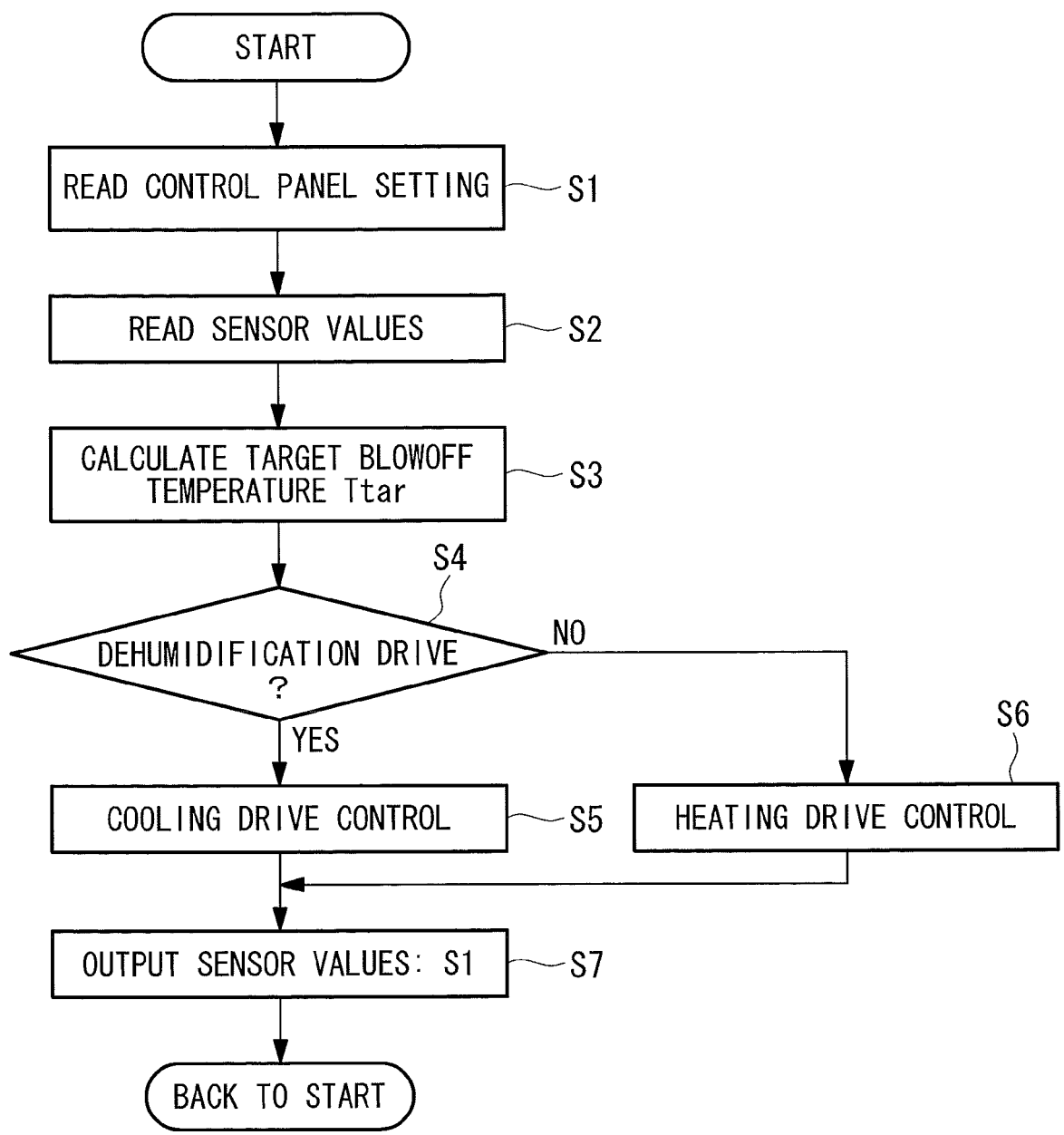
FIG. 9 is a flow diagram of drive control by the control apparatus shown in FIG. 8.

FIG. 9 is a main control flow diagram of the automotive air conditioner 101. When the control is started, the settings of the control panel 152 is read in step S1, and detection values are read from the various sensors 153 to 160 in step S2. Based on the set values and the detection values, a target blowoff temperature Ttar is calculated in step S3, and the process moves to step S4. Whether there is dehumidification drive is determined here. If YES, the process moves to step S5 to enter "cooling mode control". If NO, the process moves to step S6 to enter "heating mode control". In step S7, the detection values of the sensors are output, and the process returns to the start point.

Figure 10:
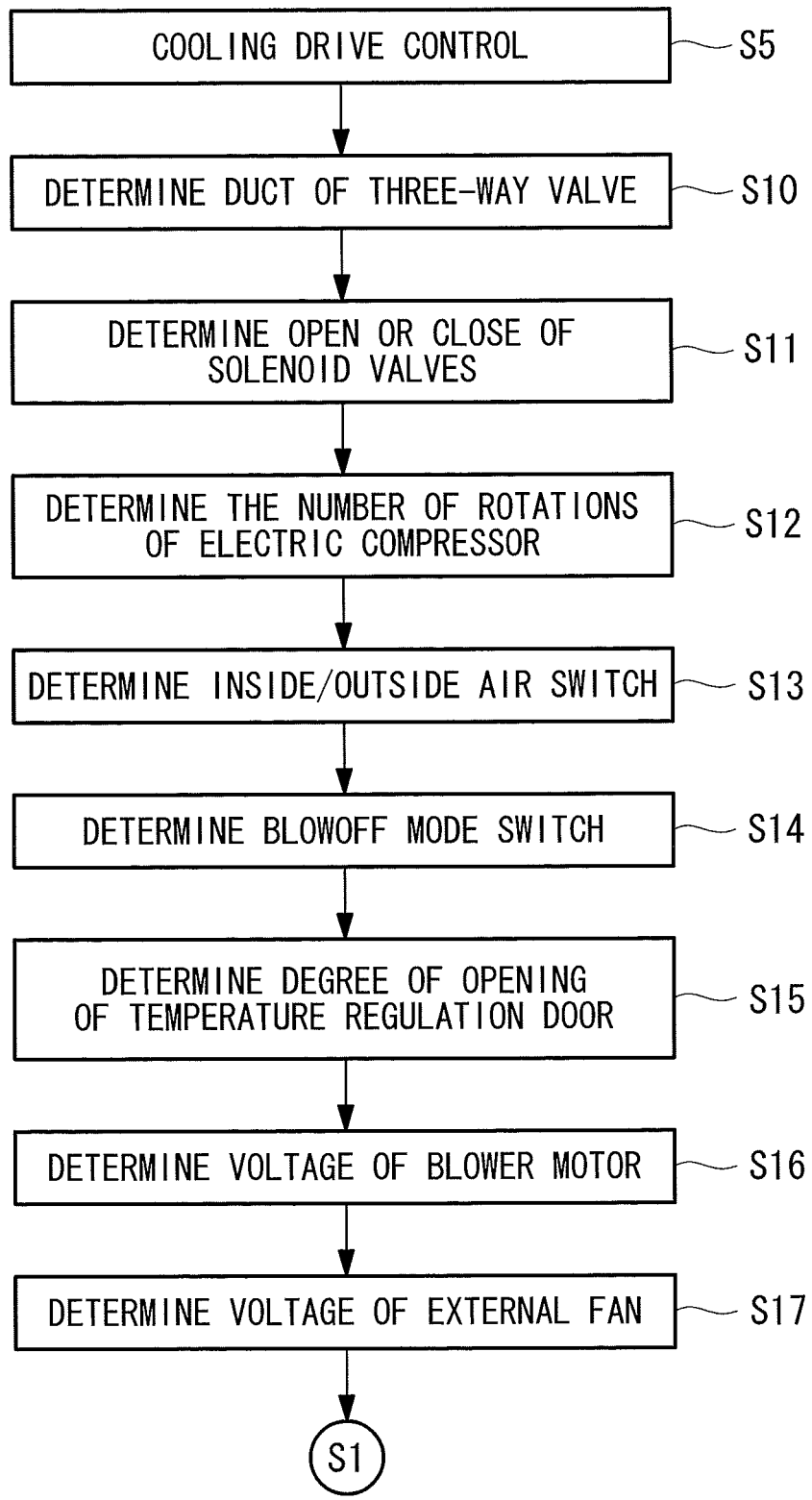
FIG. 10 is a control flow diagram during cooling mode by the control apparatus shown in FIG. 8.

When the process enters the "cooling mode control" in step S5, the process moves to cooling mode control shown in FIG. 10. In the cooling mode control, the duct of the three-way switch valve 128 is determined in step S10, and the three-way switch valve 128 is connected to a circuit that supplies the refrigerant toward the external condenser 121. In step S11, the open or close of the solenoid valves is determined. The solenoid valve 123 is opened, and the solenoid valve 130 is closed. In this way, the cooling cycle 127 is set.

In step S12, the number of rotations of the electric compressor 120 is determined. In step S13, the suction mode based on the switch of the inside/outside air switch door 104 is determined. In step S14, the blowoff mode based on the switch of the blowoff mode switch doors 114, 115, and 116 is determined. In step S15, the degree of opening of the temperature regulation door 110 is determined. In step S16, the drive voltage of the blower 105 is determined. In step S17, the drive voltage of the external fan 136 is determined. The motor and the actuators 161 to 166 are driven, and the cooling mode is performed so that the internal temperature coincides with the preset temperature. The process moves to S1 (step S7), and the cooling mode continues.

Figure 11A:
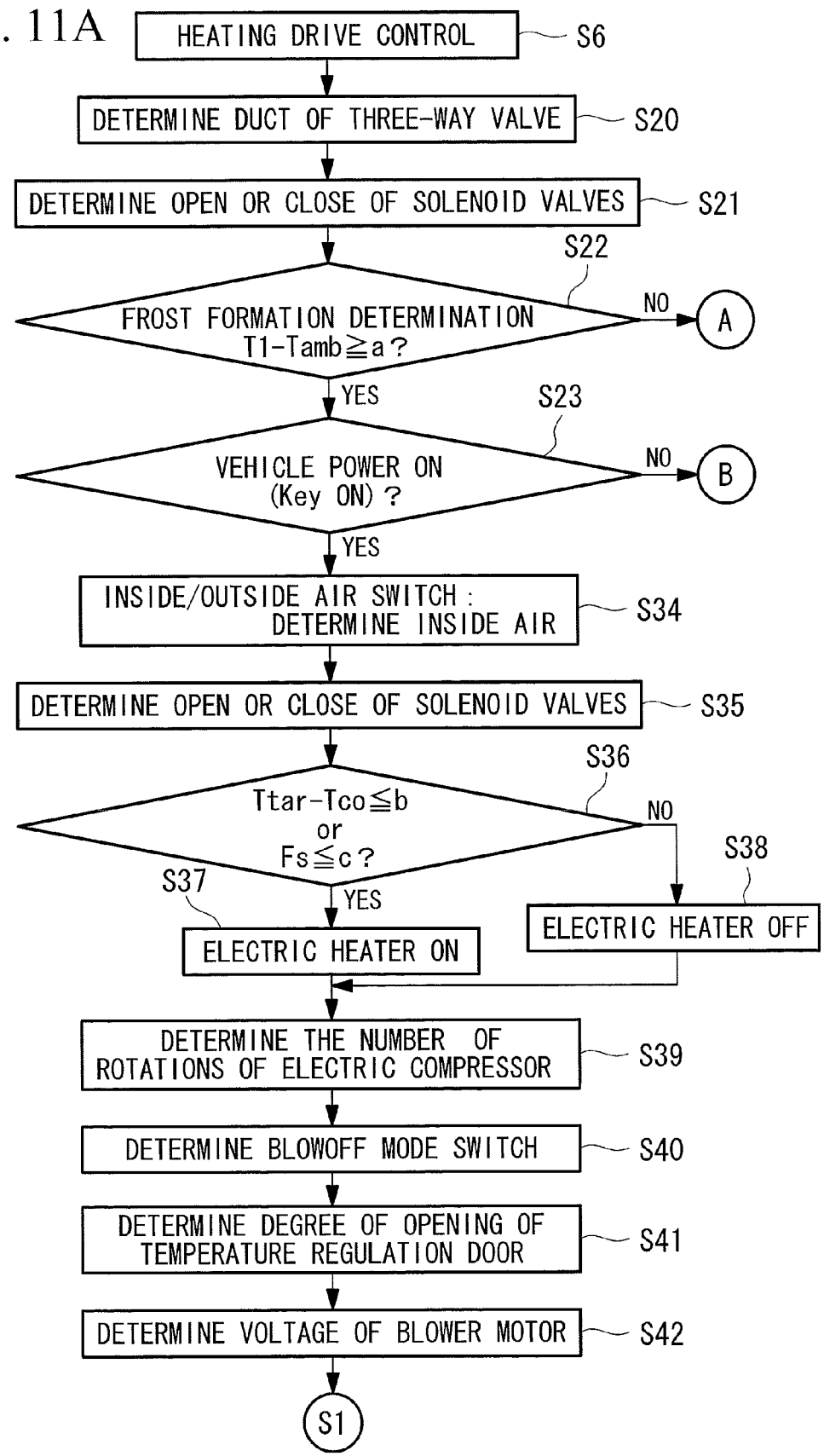
FIG. 11A is a partial view of a control flow diagram during heating mode by the control apparatus shown in FIG. 8.
Figure 11B:
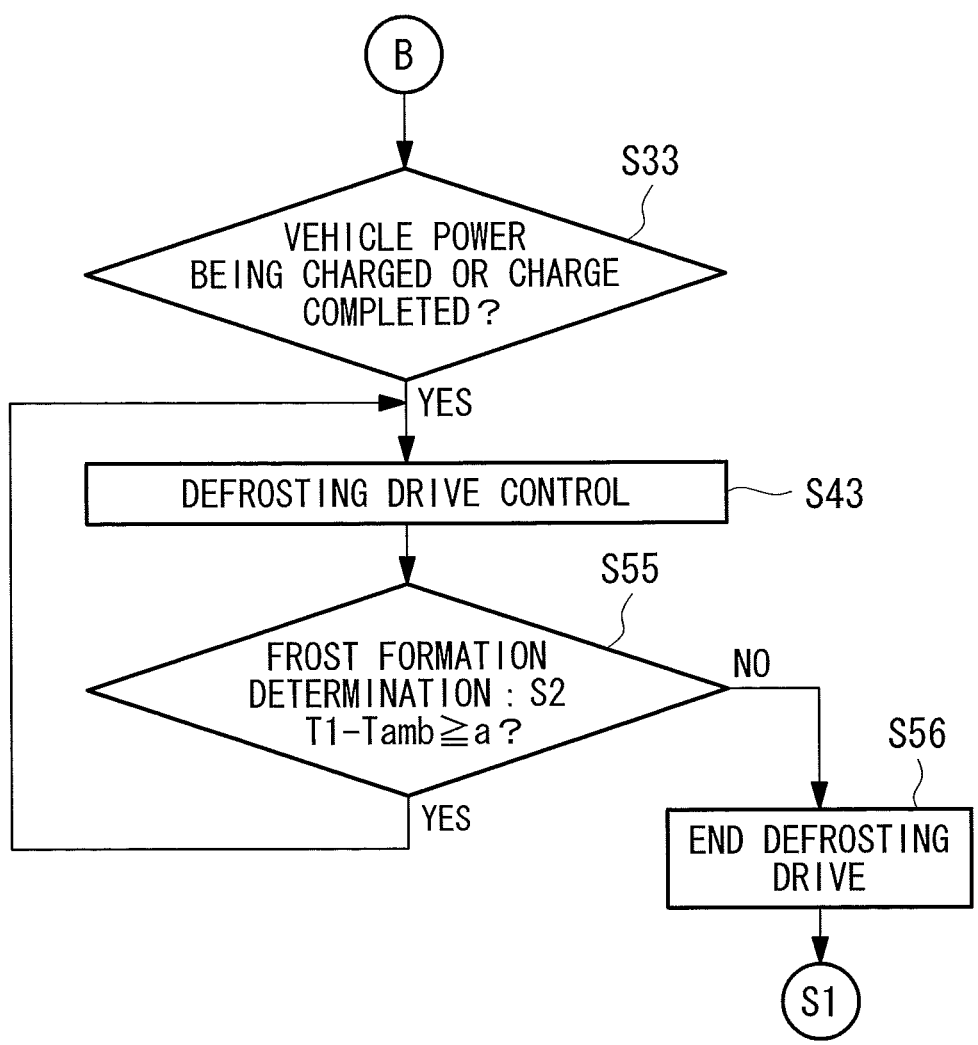
FIG. 11B is a partial view of the control flow diagram during heating mode by the control apparatus shown in FIG. 8.
Figure 11C:
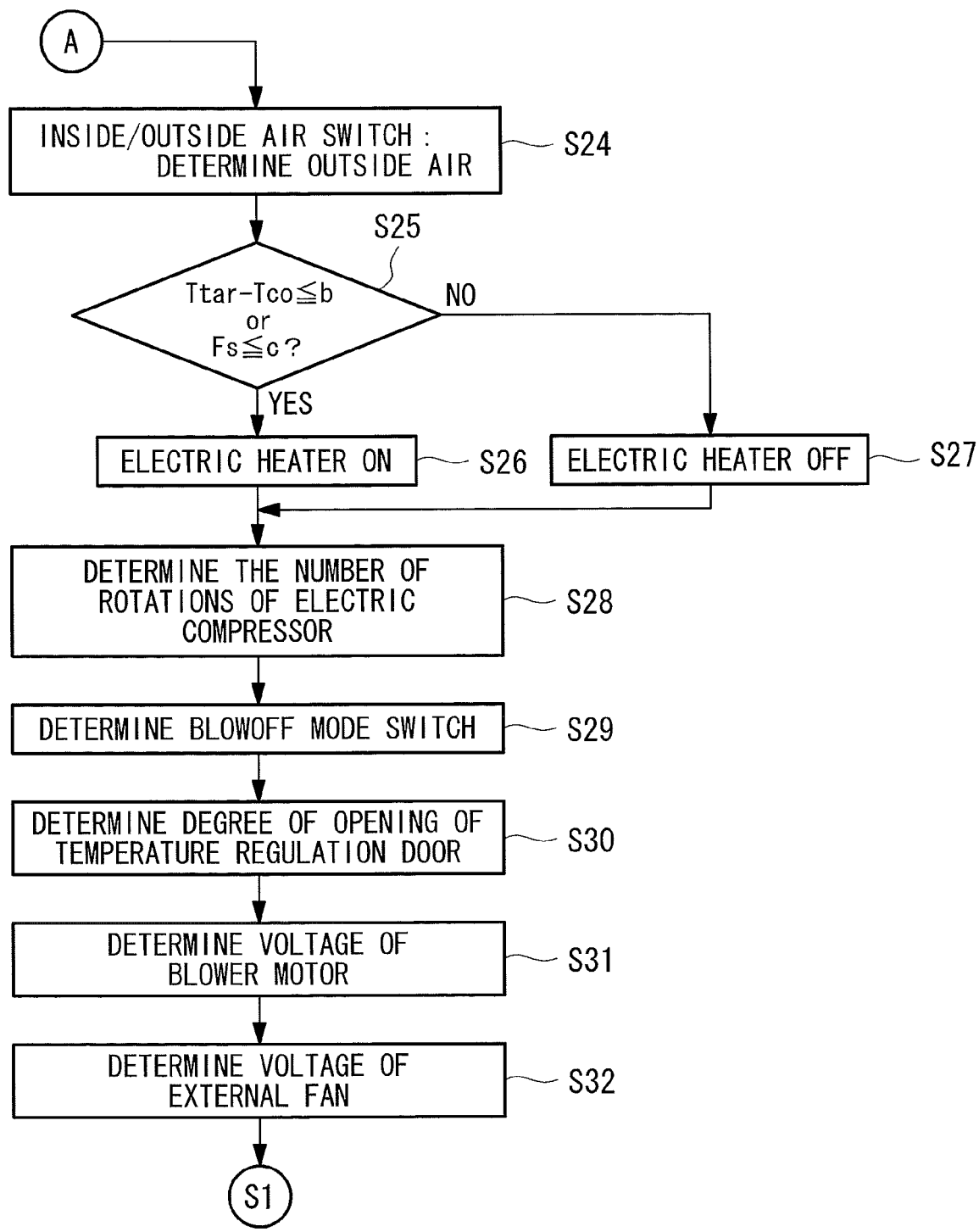
FIG. 11C is a partial view of the rest of the control flow diagram during heating mode by the control apparatus shown in FIG. 8.
Figure 12:
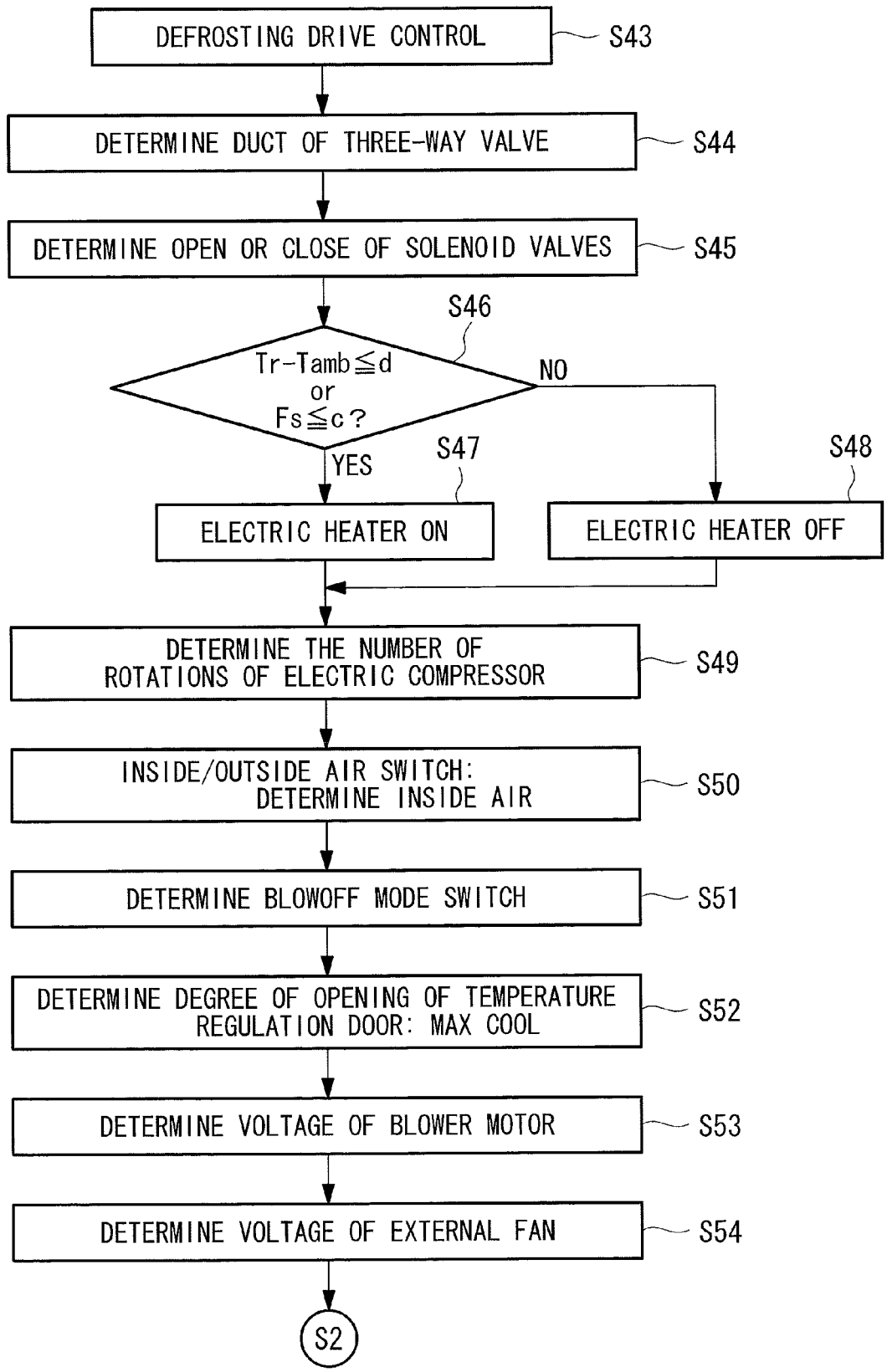
FIG. 12 is a control flow diagram during defrosting mode by the control apparatus shown in FIG. 8.

When the process enters the "heating mode control" in step S6, the process moves to heating mode control shown in FIGS. 11A to 12. In the heating mode control, the duct of the three-way switch valve 128 is determined in S20, and the three-way switch valve 128 is connected to a circuit that supplies the refrigerant toward the first heating circuit 129. In step S21, the open or close of the solenoid valves is determined. The solenoid valve 123 is closed, and the solenoid valve 130 is opened. In this way, the heat pump cycle 135 for heating before the frost formation is set, and the process moves to step S22. In step S22, whether there is frost formation on the external evaporator 132 is determined.

The frost formation is determined by whether the difference between the detection value T1 of the external evaporator refrigerant temperature sensor 158 and the detection value Tamb of the ambient temperature sensor 154 is equal to or greater than a set value a (T1−Tamb≥a). If determined YES (there is frost formation), the process moves to step S23. If determined NO (there is no frost formation), the process moves to step S24 (see FIG. 11C). If it is determined that there is no frost formation, the external evaporator 132 is operated as the evaporator, and the heat pump cycle 135 for heating before the frost formation performs the heating mode. In step S24, the inside/outside air switch door 104 is determined to be the outside air intake mode, and the process moves to step S25.

In step S25, whether the difference between the target blowoff temperature Ttar and the detection value Tco of the internal condenser blowoff temperature sensor 160 is equal to or smaller than a set value b (Ttar−Tco≤b) is determined, or whether the detection value Fs of the frost sensor 157 is equal to or smaller than a set value c (Fs≤c) is determined. If determined YES, the process moves to step S26, and the auxiliary electric heater 107 is turned on. If determined NO, the process moves to step S27, and the auxiliary electric heater 107 is turned off. In this way, if it is determined that the performance is insufficient just by the heating by the heat pump, the auxiliary electric heater 107 supplements the heating performance.

In step S28, the number of rotations of the electric compressor 120 is determined. In step S29, the blowoff mode based on the switch of the blowoff mode switch doors 114, 115, and 116 is determined. In step S30, the degree of opening of the temperature regulation door 110 is determined. In step S31, the drive voltage of the blower 105 is determined. In step S32, the drive voltage of the external fan 136 is determined. The motor and the actuators 161 and 163 to 166 are driven, and the heating mode is performed so that the internal temperature coincides with the preset temperature. The process moves to S1 (=step S7), and the heating mode continues.

On the other hand, if it is determined that there is frost formation in step S22, and the process moves to step S23, whether the vehicle power supply is ON is determined in step S23. If NO, the process moves to step 33, and if YES, the process moves to step S34. In step S34, the inside/outside air switch door 104 is determined to be the inside air circulation mode or the inside air/outside air mixed mode. The process moves to step S35, and the open or close of the solenoid valve is determined. The solenoid valve 123 is opened, and the solenoid valve 130 is closed. In this way, the heat pump cycle 135 for dehumidification heating using the internal evaporator 108 after frost formation is set. Even though the frost is formed on the external evaporator 132, the heating mode is continued.

When the open or close of the solenoid valves is determined in step S35, the process moves to step S36. In step S36, whether the difference between the target blowoff temperature Ttar and the detection value Tco of the internal condenser blowoff temperature sensor 160 is equal to or smaller than the set value b (Ttar−Tco≤b) is determined, or whether the detection value Fs by the frost sensor 157 is equal to or smaller than the set value c (Fs≤c) is determined. If determined YES, the process moves to step S37, and the auxiliary electric heater 107 is turned on. If determined NO, the process moves to step S38, and the auxiliary electric heater 107 is turned off. In this way, if it is determined that the performance is insufficient just by the heating by the heat pump, the auxiliary electric heater 7 supplements the heating performance.

In step S39, the number of rotations of the electric compressor 120 is determined. In step S40, the blowoff mode based on the switch of the blowoff mode switch doors 114, 115, and 116 is determined. In step S41, the degree of opening of the temperature regulation door 110 is determined. In step S42, the drive voltage of the blower 105 is determined. The motor and the actuators 161, 163, 164, and 166 are driven to perform the heating mode after frost formation on the external evaporator 132 so that the internal temperature coincides with the present temperature. The process moves to S1 (=step S7), and the heating mode continues.

If it is determined NO in step S23, that is, if it is determined that the vehicle power supply is OFF, and the process moves to step S33, whether the vehicle power supply (battery) is charged or the charge is completed is determined in step S33. If determined YES, it is determined that the vehicle is stopped (parked), there is no passenger, and the vehicle battery is charged or the charged is completed. The process moves to step S43, and "defrosting mode control" of the frost formed on the external evaporator 132 is carried out. Although the frost of the external evaporator 132 may be naturally defrosted during continuous drive after the frost formation, the "defrosting mode control" is always performed when the vehicle power supply is OFF after the frost formation determination.

In the "defrosting mode control", the duct of the three-way switch valve 128 is determined in step S44 as shown in FIG. 12, and the three-way switch valve 128 is connected to a circuit that supplies the refrigerant toward the external condenser 121. In step S45, the open or close of the solenoid valves is determined. The solenoid valve 123 is opened, and the solenoid valve 130 is closed. In this way, the cooling cycle 127 is set, and the process moves to step S46. In step S46, whether the difference between the detection value Tr of the internal temperature sensor 153 and the detection value Tabm of the ambient temperature sensor 154 is equal to or smaller than a set value d (Tr−Tamb d) is determined, or whether the detection value Fs by the frost sensor 57 is equal to or smaller than the set value c (Fs≤c) is determined.

If it is determined YES in step S46, the process moves to step S47, and the auxiliary electric heater 107 is turned on. If it is determined NO, the process moves to step S48, and the auxiliary electric heater 107 is turned off. In this way, if it is determined that the internal temperature is low, that sufficient heat absorption by the internal evaporator 108 cannot be expected, and that the heat necessary for defrosting is insufficient, the auxiliary electric heater 107 can heat the internal air circulated to the internal evaporator 108.

In step S49, the number of rotations of the electric compressor 120 is determined. In step S50, the suction mode (inside air circulation mode) based on the switch of the inside/outside air switch door 104 is determined. In step S51, the blowoff mode based on the switch of the blowoff mode switch doors 114, 115, and 116 is determined. In step S52, the degree of opening (MAX COOL position) of the temperature regulation door 110 is determined. In step S53, the drive voltage of the blower 105 is determined. In step S54, the drive voltage of the external fan 136 is determined. The motor and the actuators 161 to 166 are driven, and the defrosting mode is performed in the inside air circulation mode while setting the temperature regulation door 110 to the maximum cooling position (MAX COOL position) to suppress the heat release by the internal condenser 109.

In the present embodiment, the blowoff mode switch doors 114, 115, and 116 set the blowoff mode to one of the def mode, the face mode, and the bilevel mode in the defrosting mode. This is to prevent the air at a low temperature blown off from the foot blowoff port 113 to the vehicle interior from short circuiting from a nearby suction port for the inside air circulation in the defrosting mode performed in the internal air circulation mode as described above.

When the "defrosting mode control" of steps S43 to S54 is finished, the process moves to S2 (=step S55), and the frost formation determination is carried out. As in the frost formation determination in step S22, whether the difference between the detection value T1 of the external evaporator refrigerant temperature sensor 158 and the detection value Tamb of the ambient temperature sensor 154 is equal to or greater than the set value a (T1−Tamb≥a) is determined in the frost formation determination. If determined YES (there is frost formation), the process returns to step S43, and the "defrosting mode control" continues. If determined NO (there is no frost formation), the process moves to step S56, and the defrosting mode is finished.

According to the present embodiment, the following effects are attained.

According to the heat-pump automotive air conditioner 101 of the present embodiment, minimal heating circuits and devices, such as the internal condenser 109, the first heating circuit 129, and the second heating circuit 134 including the second expansion valve 131 and the external evaporator 132, are connected to the conventionally known refrigerant cycle for cooling including the electric compressor 120, the external condenser 121, the receiver 122, the first expansion valve 124, and the internal evaporator 108 arranged in the HVAC unit 102. As a result, the refrigerant circuits and the devices with the same pressure conditions can be shared to form the heat pump cycle 135 for heating.

Therefore, a low-cost, highly reliable, highly efficient heat-pump automotive air conditioner 101 with a relatively simple configuration and with excellent ease of mounting that can be suitably applied to electric vehicles and hybrid vehicles can be provided just by sharing the refrigerant circuits and devices with the same pressure conditions as those of the cooling cycle of an existing automotive air conditioner applied to an ICEV system and by adding minimal heating circuits and devices with different pressure conditions, without newly developing refrigerant circuits with specifications that can endure both the cooling and heating modes.

Even if frost is formed on the external evaporator 132 when the ambient temperature is low, the flow of the refrigerant to the second heating circuit 134 can be cut off to distribute the refrigerant toward the internal evaporator 108, and the switch to the dehumidification heating using the internal evaporator 108 is possible. Therefore, when the frost is formed on the external evaporator 132, the evaporator can be switched to the internal evaporator 108, and efficient heat-pump heating mode can be continued. Therefore, interruption of the heating mode or loss of power consumption by switching to the defrosting mode in the heating mode during running can be eliminated.

After the switch to the dehumidification heating using the internal evaporator 108, the drive is based on the inside air circulation mode or the inside air/outside air mixed mode. As a result, in the dehumidification heating mode using the internal evaporator 108, the internal air or the mixed air of the inside and outside air at a relatively high temperature can be used as a heat source to perform the heat-pump heating mode. Therefore, the heating performance can be sufficiently secured. When the ambient temperature is low, the heating mode is usually performed based on the outside air intake mode to prevent window fogging. However, the dehumidification heating using the internal evaporator 108 can prevent the window fogging even based on the inside air circulation mode or the inside air/outside air mixed mode.

The external evaporator 132 is disposed on the downstream of the external condenser 121 and/or the vehicle radiator 137 in the air duct of the external condenser external fan 136. Therefore, the external condenser 121 and/or the vehicle radiator 137 can block snow during snowfall or can block deposited snow, and the attachment of the snow to the external evaporator 132 can be reduced. Therefore, the heat exchange performance in the external evaporator 132 can be secured to improve the heating performance, and freezing by the attachment of snow to the external evaporator 132 can be prevented. If there is heat released from the radiator 137 for vehicle, the heat can be absorbed to improve the heating performance.

The auxiliary electric heater (PTC heater) 107 for heating is installed on the upstream of the internal evaporator 108 in the HVAC unit 102, and if the amount of absorbed heat is insufficient during heating, the auxiliary electric heater 107 can be activated to absorb the heat to perform the heat pump heating. Therefore, if the amount of absorbed heat in the internal evaporator 108 is insufficient, and the internal temperature does not rise sufficiently, the auxiliary electric heater 107 can be activated to absorb the heat to perform the heat-pump heating mode. As a result, even if the heating performance is insufficient when the ambient temperature is low, the heating performance can be easily supplemented. The auxiliary electric heater 107 can be similarly used as an auxiliary heat source during the heating mode using the external evaporator 132.

In the present embodiment, the internal heat exchanger 140 for heat exchange between the low-pressure gas refrigerant sucked in to the electric compressor 120 and the high-pressure liquid refrigerant from the receiver 122 is arranged between the refrigerant piping 126C of the electric compressor 120 and the outlet piping (refrigerant piping) 126D of the receiver 122. Therefore, the internal heat exchanger 140 can exchange the heat between the low-pressure gas refrigerant and the high-pressure liquid refrigerant both during cooling and during heating to thereby supercool the high-pressure liquid refrigerant to increase the amount of absorbed heat by the evaporators 108 and 132. In this way, the cooling efficiency and the heating efficiency can be improved, and the cooling and heating performance of the heat-pump automotive air conditioner 101 can be improved.

According to the present embodiment, if frost is formed on the external evaporator 132 during the heat-pump heating mode using the external evaporator 132, defrosting is performed when there is no passenger after the termination of the vehicle. The temperature regulation door 110 of the HVAC unit 102 is set to the maximum cooling position (MAX COOL position), and the inside/outside air switch door 104 is set to the inside air circulation mode. The automotive air conditioner 101 is operated by the cooling cycle, and the warm air heated by the hot gas distributed to the external condenser 121 is blown off. Therefore, defrosting is possible without supplying the high-pressure hot gas to the external evaporator 132 on which the frost is formed. In this regard, new development of the refrigerant circuits and devices with specifications that can endure the circulation of refrigerants at high and low pressures is not necessary.

In the defrosting, the temperature regulation door 110 of the HVAC unit 102 is set to the maximum cooling position, and the inside/outside air switch door 104 is set to the inside air circulation mode. The internal air is used as the heat source, and the heat of the hot gas can be effectively used for the defrosting while eliminating the heat release loss in the internal condenser 109. Therefore, defrosting is possible in a short time. The defrosting mode is performed when there is no passenger after the termination of the vehicle and is performed during or after the charge of the vehicle battery. As a result, the influence of the defrosting mode on the drive distance of the vehicle can be avoided, and the defrosting mode can be performed when there is enough battery capacity during or after the charge of the vehicle battery. Therefore, the external evaporator 132 can be efficiently and surely defrosted without affecting the passenger in any way.

In the defrosting mode, the blowoff mode of the HVAC unit 102 is set to one of the def mode, the face mode, and the bilevel mode. Therefore, in the defrosting mode performed in the inside air circulation mode, the reduction in the temperature by the heat absorption by the internal evaporator 108 and short circuiting of the air, which is blown off from the foot blowoff port 113 to the vehicle interior, from the suction port for the inside air circulation near the foot blowoff port 113 can be prevented. As a result, the temperature of the air sucked from the vehicle interior by the inside air circulation can be increased as much as possible, and the external evaporator 132 can be effectively defrosted in a short time.

If the internal temperature is low in the defrosting mode, the auxiliary electric heater 107 is activated, and the internal evaporator 108 absorbs the heat to improve the defrosting performance. Therefore, if the internal temperature is low in the defrosting mode performed in the inside air circulation mode, the inside air circulated by the auxiliary electric heater 107 can be heated to allow the internal evaporator 108 to sufficiently absorb the heat. Therefore, efficient defrosting is possible in a short time even if the internal temperature is low. In the defrosting, the number of rotations of the electric compressor 120 can be increased to supply hot gas at a higher temperature to the external condenser 121 to thereby further reduce the defrosting time of the external evaporator 132.

In the present embodiment, the heat-pump heating mode using the external evaporator 132 is carried out at the end of the defrosting mode, and the defrosting mode is finished when the frost formation detection unit confirms that there is no frost formation. Therefore, the heat-pump heating mode can be carried out to confirm the completion of the defrosting when the frost formation detection unit determines that there is no frost formation on the external evaporator 132, that is, when the frost formation detection unit is not activated. As a result, the external evaporator 132 can be surely defrosted without leaving the frost.

The present invention is not limited to the inventions according to the embodiments, and various changes can be made as necessary without departing from the scope of the present invention. For example, in the embodiments, the defrosting mode is not performed when the vehicle is running in the heat-pump heating mode even if the frost is formed on the external evaporator 132. However, if the frost formed when the vehicle is running is naturally defrosted, the heat-pump heating mode using the external evaporator 132 may be restored. In the embodiments, the blowoff mode switch doors are in a three-door system including the def door 114, the face door 115, and the foot door 116. However, one door may serve as the def door 114 and the face door 115, and a two-door system including the door and the foot door 116 may also be used.

In the embodiments, the first solenoid valve 123 and the second solenoid valve 130 are arranged on the inlet sides of the first expansion valve 124 and the second expansion valve 131. However, the first solenoid valve 123 and the first expansion valve 124 as well as the second solenoid valve 130 and the second expansion valve 131 may be integrated automatic thermal expansion valves with solenoid open/close valves. In the embodiments, the internal heat exchanger 140 is included in the description. However, the internal heat exchanger 140 is not essential in the present invention, and the internal heat exchanger 140 may be omitted in the system to simplify the configuration or to reduce the cost.

REFERENCE SIGNS LIST 1 heat-pump automotive air conditioner
2 HVAC unit
3 heat pump cycle
6 auxiliary electric heater
7 internal evaporator
8 internal condenser
9 electric compressor
10 external condenser
11 receiver (receiver with check valves)
12 first solenoid valve
13 first expansion valve (automatic thermal expansion valve)
14 check valve
15 refrigerant piping
15A discharge circuit (refrigerant piping)
16 refrigerant cycle for cooling
17 three-way switch valve (switching unit)
18 first heating circuit
19 second solenoid valve
20 second expansion valve (automatic thermal expansion valve)
21 external evaporator
22 check valve
23 second heating circuit
24 heat pump cycle for heating
25 external fan
26, 27 refrigerant inlets
28, 29 check valves
101 heat-pump automotive air conditioner
102 HVAC unit
103 heat pump cycle
104 inside/outside air switch door
107 auxiliary electric heater
108 internal evaporator
109 internal condenser
110 temperature regulation door
120 electric compressor
121 external condenser
122 receiver
124 first expansion valve
126A discharge circuit (refrigerant piping)
126D outlet piping (refrigerant piping)
126E intake piping (refrigerant piping)
127 refrigerant cycle for cooling
128 three-way switch valve (switching unit)
129 first heating circuit
131 second expansion valve
132 external evaporator
134 second heating circuit
135 heat pump cycle for heating
136 external fan
137 radiator
140 internal heat exchanger

The invention claimed is:

1. A heat-pump automotive air conditioner comprising:
a refrigerant cycle for cooling, to which an electric compressor, an external condenser, a receiver, a first expansion valve, and an internal evaporator arranged in an HVAC unit are connected in this order;
an internal condenser connected to a discharge circuit of the electric compressor and disposed on a downstream of the internal evaporator in the HVAC unit;
a first heating circuit connected to the receiver through a switching unit arranged on an inlet side of the external condenser; and
a second heating circuit connected between an outlet of the receiver and a suction side of the electric compressor and provided with a second expansion valve and an external evaporator, wherein
the electric compressor, the internal condenser, the switching unit, the first heating circuit, the receiver, and the second heating circuit having the second expansion valve and the external evaporator form a heat pump cycle for heating,
the heat-pump automotive air conditioner further comprising:
a sensor configured to detect frost formation on the external evaporator;
a first on/off valve for closing/opening a channel which allows refrigerant to flow from the receiver to the second expansion valve;
a second on/off valve for closing/opening a channel which allows the refrigerant to flow from the receiver to the electric compressor through the internal evaporator, and
a controller configured to determine the frost formation on the basis of detection of the sensor during the heating operation with the heat pump cycle, and configured to close the first on/off valve and open the second on/off valve when the frost formation is detected, and thereby prevent the refrigerant from flowing into the second heating circuit and allow the refrigerant to flow into the internal evaporator.

2. The heat-pump automotive air conditioner according to claim 1, wherein
when the switch is made to the dehumidification heating using the internal evaporator, the heat-pump automotive air conditioner is operated in an inside air circulation mode or an inside air/outside air mixed mode.

3. The heat-pump automotive air conditioner according to claim 1, wherein
the external evaporator is disposed in an air duct of an external fan for the external condenser, on a downstream of the external condenser and/or a vehicle radiator.

4. The heat-pump automotive air conditioner according to claim 1, wherein
an auxiliary electric heater for heating is installed on an upstream of the internal evaporator in the HVAC unit, and when an amount of absorbed heat is insufficient during heating, the auxiliary electric heater can be activated to absorb the heat, and heat-pump heating mode is possible.

5. The heat-pump automotive air conditioner according to claim 1, wherein
an internal heat exchanger that exchanges heat of a low-pressure gas refrigerant introduced to the electric compressor and a high-pressure liquid refrigerant from the receiver is arranged between intake piping of the electric compressor and outlet refrigerant piping of the receiver.

6. A method for defrosting the external evaporator in the heat-pump automotive air conditioner according to claim 1, wherein the method comprises
operating the automotive air conditioner in the cooling cycle by setting a temperature regulation door of the HVAC unit to a maximum cooling position and setting an inside/outside air switch door to an inside air circulation mode when there is no passenger after termination of the vehicle, and defrosting the external evaporator by warm air heated by hot gas distributed to the external condenser.

7. The defrosting method of the heat-pump automotive air conditioner according to claim 6 wherein said method further comprises, performing a defrosting mode during or after charging of a vehicle battery when there is no passenger after the termination of the vehicle engine.

8. The defrosting method of the heat-pump automotive air conditioner according to claim 6, wherein said method further comprises in a defrosting mode, a blowoff mode of the HVAC unit is one of a def mode, a face mode, and a bilevel mode.

9. The defrosting method of the heat-pump automotive air conditioner according to claim 6, wherein said method further comprises activating an auxiliary heater when an internal temperature is low in a defrosting mode and having the internal evaporator absorbs the heat to improve defrosting performance.

10. The defrosting method of the heat-pump automotive air conditioner according to claim 6, wherein said method further comprises carrying out a heat-pump heating mode using the external evaporator to finish a defrosting mode and finishing the defrosting mode when a frost formation detection unit confirms that there is no frost formation.

* * * * *